US012769984B2

(12) United States Patent
Kim et al.

(10) Patent No.: US 12,769,984 B2
(45) Date of Patent: Oct. 20, 2026

(54) METHOD AND DEVICE FOR CORRECTING IMAGE ON BASIS OF COMPRESSION QUALITY OF IMAGE IN ELECTRONIC DEVICE

(71) Applicant: SAMSUNG ELECTRONICS CO., LTD., Suwon-si (KR)

(72) Inventors: Kyuwon Kim, Suwon-si (KR); Jongkyu Kim, Suwon-si (KR); Hyunsoo Kim, Suwon-si (KR); Sujung Bae, Suwon-si (KR); Heekuk Lee, Suwon-si (KR); Inho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 246 days.

(21) Appl. No.: 18/241,637

(22) Filed: Sep. 1, 2023

(65) Prior Publication Data

US 2023/0419452 A1 Dec. 28, 2023

Related U.S. Application Data

(63) Continuation of application No. PCT/KR2021/016121, filed on Nov. 8, 2021.

(30) Foreign Application Priority Data

Mar. 3, 2021 (KR) ........................ 10-2021-0028305

(51) Int. Cl.
*G06T 5/70* (2024.01)
*G06F 3/04842* (2022.01)
(Continued)

(52) U.S. Cl.
CPC ....... *G06N 3/0455* (2023.01); *G06F 3/04842* (2013.01); *G06F 3/04845* (2013.01);
(Continued)

(58) Field of Classification Search
CPC ........................................................ G06T 9/00
See application file for complete search history.

(56) References Cited

U.S. PATENT DOCUMENTS

| | | | |
|---|---|---|---|
| 9,325,985 | B2 | 4/2016 | Kolarov et al. |
| 10,652,591 | B2 | 5/2020 | Bae et al. |

(Continued)

FOREIGN PATENT DOCUMENTS

| | | | | |
|---|---|---|---|---|
| CN | 111565258 B | * | 5/2022 | G06V 10/772 |
| CN | 111091518 B | * | 5/2023 | G06T 9/00 |

(Continued)

OTHER PUBLICATIONS

Extended European Search Report dated Jun. 11, 2024, issued by the European Patent Office in European Application No. 21929305.7.

(Continued)

*Primary Examiner* — Di Xiao
(74) *Attorney, Agent, or Firm* — Sughrue Mion, PLLC

(57) ABSTRACT

A compression quality of a compression image is classified and a compression artifact of the compression image is removed on the basis of a noise removal model trained to correspond to the compression quality. The image with the artifact removed is a corrected image. An electronic device includes a display, a memory, and a processor. The processor selects a noise removal model trained to correspond to the determined compression quality and displays the corrected image for user feedback. The user may confirm or reject the correction.

18 Claims, 18 Drawing Sheets

(51) Int. Cl.

| | |
|---|---|
| ***G06F 3/04845*** | (2022.01) |
| ***G06N 3/0455*** | (2023.01) |
| ***G06T 5/60*** | (2024.01) |
| ***G06V 10/98*** | (2022.01) |

(52) U.S. Cl.

CPC .................. *G06T 5/60* (2024.01); *G06T 5/70* (2024.01); *G06V 10/993* (2022.01); *G06F 2203/04806* (2013.01)

(56) References Cited

U.S. PATENT DOCUMENTS

| | | | | |
|---|---|---|---|---|
| 10,909,700 | B2 | 2/2021 | Lim et al. | |
| 11,017,506 | B2 | 5/2021 | Mayol Cuevas et al. | |
| 11,175,908 | B2 | 11/2021 | McBride et al. | |
| 2010/0027686 | A1 | 2/2010 | Zuo et al. | |
| 2010/0073510 | A1* | 3/2010 | Nemoto | H04N 23/83 348/E5.037 |
| 2010/0315555 | A1 | 12/2010 | Sakurai et al. | |
| 2013/0202209 | A1 | 8/2013 | Ariyama | |
| 2016/0205049 | A1* | 7/2016 | Kim | H04L 51/216 455/414.1 |
| 2017/0311027 | A1 | 10/2017 | Krikorian | |
| 2019/0281310 | A1 | 9/2019 | Lee et al. | |
| 2019/0306564 | A1 | 10/2019 | Krikorian et al. | |
| 2020/0005100 | A1 | 1/2020 | Kim | |
| 2020/0020132 | A1* | 1/2020 | Sinharoy | H03M 7/70 |
| 2020/0302611 | A1* | 9/2020 | Uemura | G06F 18/214 |
| 2020/0349675 | A1 | 11/2020 | Park et al. | |
| 2020/0364556 | A1* | 11/2020 | Irani | G06N 3/088 |
| 2021/0400231 | A1 | 12/2021 | Park et al. | |
| 2022/0270209 | A1* | 8/2022 | Mironica | H04N 19/86 |

FOREIGN PATENT DOCUMENTS

| | | | | |
|---|---|---|---|---|
| JP | 2010-288079 A | | 12/2010 | |
| JP | 2013-162436 A | | 8/2013 | |
| JP | 2018107797 A | * | 7/2018 | H04N 23/741 |
| KR | 10-2008-0067385 A | | 7/2008 | |
| KR | 10-2016-0031854 A | | 3/2016 | |
| KR | 10-2019-0048196 A | | 5/2019 | |
| KR | 10-2019-0103047 A | | 9/2019 | |
| KR | 10-2019-0104927 A | | 9/2019 | |
| KR | 10-2019-0105745 A | | 9/2019 | |
| KR | 10-2020-0045740 A | | 5/2020 | |
| KR | 10-2020-0116836 A | | 10/2020 | |
| KR | 10-2020-0127809 A | | 11/2020 | |
| WO | WO-2020128134 A1 | * | 6/2020 | G06V 10/774 |

OTHER PUBLICATIONS

Galteri et al., “Deep Universal Generative Adversarial Compression Artifact Removal”, IEEE Transactions on Multimedia, vol. 21, No. 8, Aug. 2019, pp. 2131-2145 (15 pages total).

Dong et al., “Compression Artifacts Reduction by a Deep Convolutional Network”, 2015 IEEE International Conference on Computer Vision, pp. 576-584 (9 pages total).

Sima Sonawane et al., “Review of Artifacts in JPEG Compression and Reduction”, International Journal of Advanced Research in Electronics and Communication Engineering (IJARECE), ISSN: 2278-909X, vol. 6, Issue 3, Mar. 2017, pp. 164-167.

International Search Report (PCT/ISA/210) issued by the International Searching Authority on Feb. 11, 2022 in International Patent Application No. PCT/KR2021/016121.

Written Opinion (PCT/ISA/237) issued by the International Searching Authority on Feb. 11, 2022 in International Patent Application No. PCT/KR2021/016121.

Communication issued on Aug. 14, 2025 by Korean Intellectual Property Office (KIPO) in Korean Patent Application No. 10-2021-0028305.

Communication dated Jun. 11, 2026, issued by the Korean Ministry of Intellectual Property in Korean Application No. 10-2021-0028305.

Communication issued on Mar. 5, 2026 by the Intellectual Property India in Indian Patent Application No. 202317058655.

Communication issued on May 1, 2026 by the China National Intellectual Property Administration in Chinese Patent Application No. 202180095128.9.

* cited by examiner

METHOD AND DEVICE FOR CORRECTING IMAGE ON BASIS OF COMPRESSION QUALITY OF IMAGE IN ELECTRONIC DEVICE

CROSS REFERENCE TO RELATED APPLICATIONS

The present application is a continuation of international application PCT/KR2021/016121 filed Nov. 8, 2021 which claims benefit of priority to KR Patent Application No. 10-2021-0028305 filed on Mar. 3, 2021. The above applications are hereby incorporated by reference.

FIELD

Embodiments of the disclosure provide a method and a device for correcting an image in an electronic device.

BACKGROUND

With diversification of functions, electronic devices are implemented as multimedia players having complex functions, for example, taking pictures or videos, playing back music or video files, playing games, receiving broadcasts, or making a call. Such electronic devices may be equipped with a display, thereby displaying function-related screens, based on the display.

An electronic device may display, on a display, an image stored in the electronic device or an image acquired from an external device (e.g., a server and/or another electronic device). Recently, as the resolution and/or physical size (e.g., the screen size of a display) of an electronic device increase, high-quality images are also required in the electronic device, and accordingly, a need for image quality improvement has been raised. For example, the importance of the image quality for an image provided by an electronic device or an external device is also increasing.

An image provided by an external device may be compressed and transmitted. For example, an image may be provided after being compressed with a certain compression quality (or a compression rate) in order to save storage in a cloud environment and minimize delay in image transmission. In this case, compression method information (e.g., resolution information) and compression quality information (e.g., compression bit rate information) of an original image are lost, and it is thus difficult for an image display device to determine an image quality related to the compression method information and the compression quality information of the original image. Accordingly, it is difficult to set an image quality appropriate for the original image and, particularly, it is difficult to implement the maximum performance of an image quality algorithm in the image display device.

SUMMARY

In image compression, for example, compression artifacts may occur on an image. For example, at least one artifact (e.g., ringing artifacts (or mosquito artifacts), blocking artifacts, blur artifacts, color distortion, and/or texture deviation) may occur in image compression. In general, more compression artifacts may occur for a higher image compression quality (or compression rate). Therefore, in an external device (e.g., a service provider such as a content server or another external device), when an image is provided to an electronic device, an issue of compressing the size of the image as much as possible while ensuring that artifacts are minimally visible to a user may be raised. In addition, recently, as electronic devices support a large-screen display, an image that is optimized for a small screen and has hidden artifacts is enlarged and provided on a large screen so that the hidden artifacts may be easily exposed to a user. For example, artifacts that are not identified on a small screen may be enlarged on a large screen so as to be identified by a user, which may be perceived as deterioration in an image quality by the user.

In various embodiments, disclosed are a method and a device capable of quickly analyzing artifacts of an image and accurately improving the same in an electronic device.

In various embodiments, disclosed are a method and a device capable of performing image processing suitable for a compression quality of a given image in an electronic device.

In various embodiments, disclosed are a method and a device capable of providing an optimal image (e.g., an image of the original quality) for a given image via image correction suitable for a compression quality at which the image is compressed, in an electronic device.

In various embodiments, disclosed are a method and a device capable of, in an electronic device, training a denoising model for each compression quality of an image, and when an image is given, correcting the image based on the denoising model trained to correspond to the compression quality of the given image.

Provided herein is a method of an electronic device, the method including: displaying a screen including at least one image via a display module; determining a compression quality of the at least one image; selecting a denoising model trained to correspond to the compression quality; performing an image correction based on the denoising model; and displaying a corrected image via the display module.

In some embodiments, the corrected image is associated with a first configured quality, the method further including: providing a user interface enabling interaction with a user in order to identify an intention of the user; receiving a first user input indicating whether the user is satisfied with the corrected image; when the first user input indicates that the user rejects the corrected image: applying a second configured quality of an other user for the at least one image; and when the first user input indicates that the user approves the corrected image: storing the first configured quality in a memory.

In some embodiments, the first configured quality is associated with a first service and the first configured quality is associated with a first level of a first compression quality associated with the first service.

In some embodiments, the second configured quality is associated with a second service and the second configured quality is associated with a second level of a second compression quality associated with the second service.

In some embodiments, the first user input indicates that the user rejects the corrected image, the method further includes: displaying a second corrected image based the second configured quality; receiving a second user input, wherein the second user input indicates that the second corrected image is rejected; selecting a third configured quality based on an explicit user input; displaying a third corrected image based on the third configured quality; and storing the third configured quality in the memory.

Also provided is a non-transitory computer readable medium storing instructions to be executed by a computer, wherein the instructions are configured to cause the computer to at least: display a screen including at least one image via a display module, determine a compression quality of the at least one image, select a denoising model trained to correspond to the compression quality, peform an image correction based on the denoising model, and display a corrected image via the display module.

In various embodiments, disclosed are a method and a device capable of, when an electronic device provides an image, removing artifacts due to lossy compression from the given image so as to reconstruct to and provide an original quality image, thereby providing a user with an optimal quality image.

In various embodiments, disclosed are a method and a device capable of, during image correction based on a compression quality of an image in an electronic device, performing image correction reflecting a user's intention.

In various embodiments, disclosed are a method and a device capable of, during image correction based on a compression quality of an image in an electronic device, performing image correction by considering various contexts complexly.

An electronic device according to an embodiment of the disclosure may include a display module, a memory, and a processor operatively connected to the display module and the memory, wherein the processor is configured to display a screen including at least one image via the display module, determine a compression quality of the at least one image, select a denoising model trained to correspond to the determined compression quality, process image correction based on the selected denoising model, and display a corrected image via the display module.

An operation method of an electronic device according to an embodiment of the disclosure may include displaying a screen including at least one image via a display module, determining a compression quality of the at least one image, selecting a denoising model trained to correspond to the determined compression quality, processing image correction based on the selected denoising model, and displaying the corrected image via the display module.

In order to solve the above tasks, various embodiments of the disclosure may include a computer-readable recording medium in which a program for executing the method in a processor is recorded.

The further scope of applicability for the disclosure will become apparent from the following detailed descriptions. However, various changes and modifications within the spirit and scope of the disclosure may be clearly understood by those skilled in the art, and it should be thus understood that the detailed descriptions and specific embodiments, such as preferred embodiments of the disclosure, are given by way of example only.

According to an electronic device and an operation method thereof according to an embodiment of the disclosure, when an electronic device provides an image, an original image quality calculation for the image can be accurately processed using a deep neural network (DNN). According to various embodiments, an electronic device can remove compression artifacts of a given image, based on a denoising model trained to correspond to a compression quality of the image, and provide the image close to an original quality, thereby improving the quality of the compressed image.

According to various embodiments, an electronic device can rapidly receive an image from the outside based on a compressed image and provide the received image to a user, while providing the user with a clear image that is the compressed image without artifacts.

According to various embodiments, an electronic device can increase convenience and efficiency in image correction for a user by supporting adjustment of the strength of image artifact removal (e.g., correction strength) in response to the user's intention (e.g., taste).

According to various embodiments, a service provider can increase a compression rate so as to transmit an image more quickly, while providing a high-quality image. According to various embodiments, a low-quality image transmitted from a service provider (e.g., a portal site or a messaging application) via a network can be improved and provided.

In addition, various effects directly or indirectly identified via the document can be provided.

BRIEF DESCRIPTION OF DRAWINGS

In relation to the description of the drawings, the same or similar reference numerals may be used for the same or similar elements.

DETAILED DESCRIPTION

Figure 1:
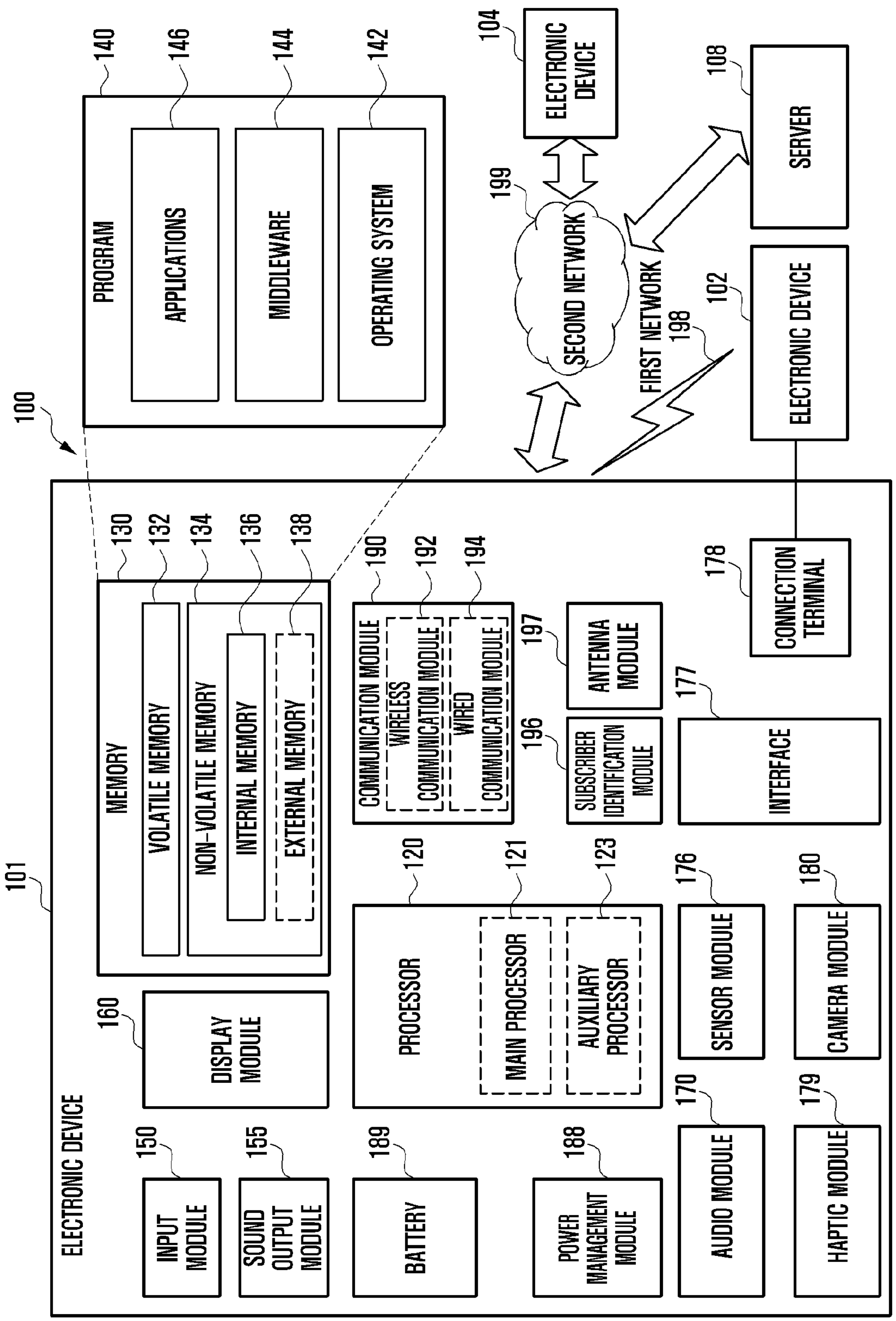
FIG. 1 is a block diagram illustrating an example electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of lms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an intemet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
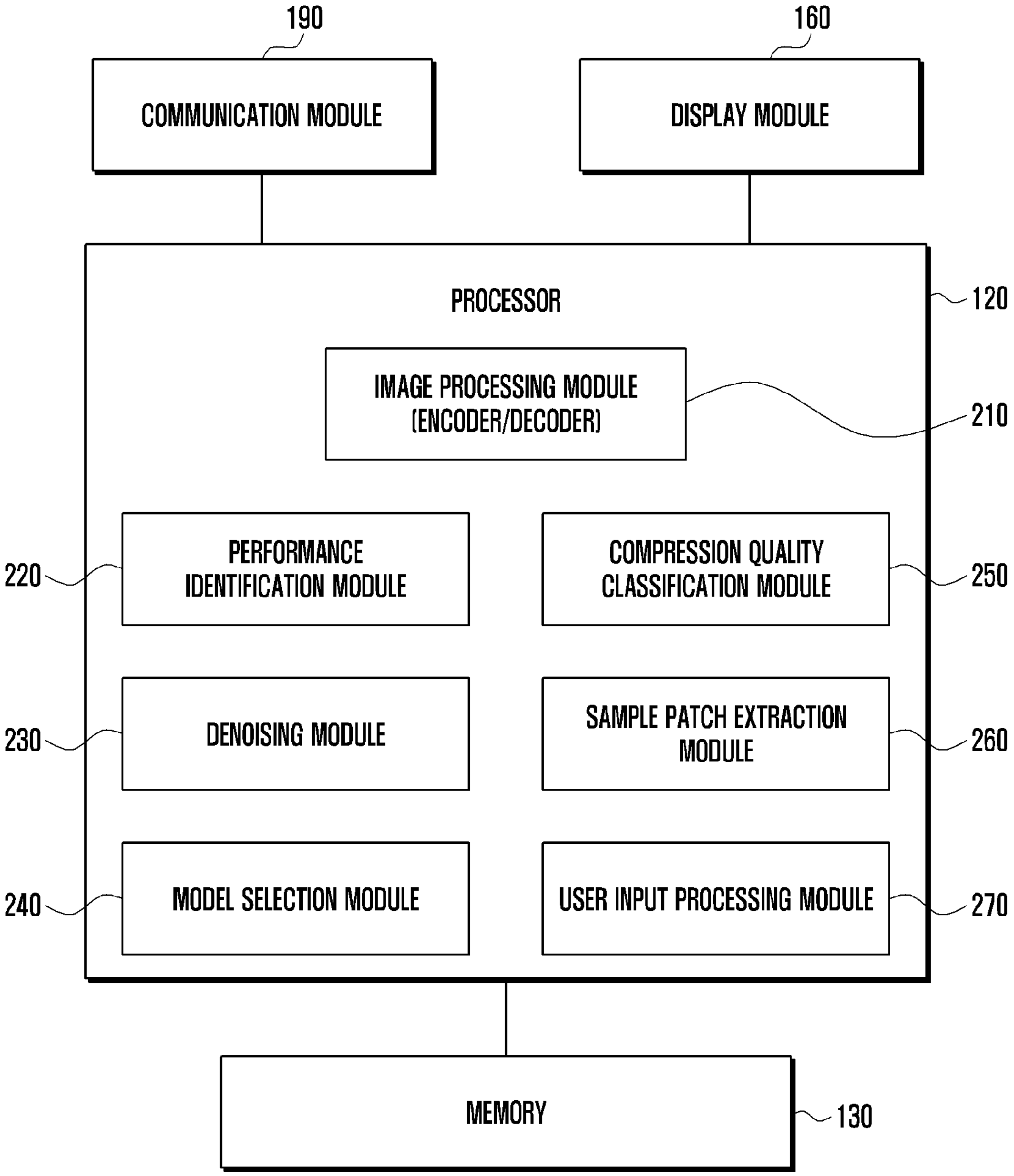
FIG. 2 is a diagram schematically illustrating elements of the electronic device according to an embodiment.

FIG. 2 is a diagram schematically illustrating elements of the electronic device according to an embodiment.

Referring to FIG. 2, according to an embodiment, the electronic device 101 may include a communication module 190, a display module 160, a processor 120, and a memory 130.

According to an embodiment, the communication module 190 may support a legacy network (e.g., 3G network and/or 4G network), a 5G network, an out-of-band (00B), and/or a next-generation communication technology (e.g., new radio (NR) technology). According to an embodiment, the communication module 190 may correspond to the wireless communication module 192 as illustrated in FIG. 1. According to an embodiment, the electronic device 101 may communicate with an external device (e.g., the server 201 of FIG. 1 and/or another electronic device 102 or 104) via a network by using the communication module 190. According to an embodiment, the electronic device 101 may receive an image and/or contents (e.g., a web page) including an image from an external device via the communication module 190.

According to an embodiment, the display module 160 may visually provide various information to the outside (e.g., user) of the electronic device 101. According to an embodiment, the display module 160 may include a touch sensing circuit (or touch sensor) (not shown), a pressure sensor capable of measuring a strength of a touch, and/or a touch panel (e.g., digitizer) for detecting a stylus pen of a magnetic field type. According to an embodiment, the display module 160 may measure a change in a signal (e.g., voltage, light quantity, resistance, electromagnetic signal and/or, electric charge quantity) for a specific position of the display module 160 on the basis of the touch sensing circuit, the pressure sensor, and/or the touch panel so as to sense a touch input and/or a hovering input (or proximity input). According to an embodiment, the display module 160 may include a liquid crystal display (LCD), an organic light emitted diode (OLED), and an active matrix organic light emitted diode (AMOLED). According to some embodiments, the display module 160 may be configured as a flexible display.

According to an embodiment, the display module 160 may visually provide an image and/or contents including an image under a control of the processor 120. According to an embodiment, the display module 160 may display various information (e.g., a user interface) related to image processing (e.g., image correction) corresponding to at least one displayed image.

According to an embodiment, the memory 130 may correspond to the memory 130 described above with reference to FIG. 1. According to an embodiment, the memory 130 may store various data used by the electronic device 101. The data may include, for example, an application (e.g., program 140 of FIG. 1) and input data or output data for a command related thereto. According to an embodiment, the memory 130 may store instructions that cause, when executed, the processor 120 to operate. For example, the application may be stored as software (e.g., program 140 of FIG. 1) in the memory 130, and may be executable by the processor 120. According to an embodiment, the application may be an application capable of using image correction in the electronic device 101.

According to an embodiment, the memory 130 may store at least one module related to a function (or operation) of processing image correction for each compression quality, which may be performed by the processor 120. For example, the memory 130 may include at least some of an image processing module 210, a performance identification module 220, a denoising module 230, a model selection module 240, a compression quality classification module 250, a sample patch extraction module 260, and/or a user input processing module 270 in the form of software (or the form of instructions).

According to an embodiment, the processor 120 may control a relevant operation for processing image correction in the electronic device 101. According to an embodiment, the processor 120 may identify a compression quality related to an image stored in the memory 130 and/or an image received from an external device, and control an operation related to processing image correction based on the compression quality. According to an embodiment, the processor 120 may control the display module 160 so that a screen including at least one image is displayed via the display module 160.

According to an embodiment, the processor 120 may determine (or classify) a compression quality (e.g., a compression rate) of a given image when the image is displayed or while the image is being displayed. According to an embodiment, the processor 120 may select a denoising model trained to correspond to a compression quality of a given image from among various denoising models 230 (or denoising models, denoisers, or artifact removers (reducers)) trained (or modeled) according to various compression qualities stored in the memory 130. According to an embodiment, the processor 120 may process (e.g., reconstructing the original quality image by removing compression artifacts from the compressed image) image correction based on the selected denoising model 230 and display a corrected image via the display module 160.

According to an embodiment, the processor 120 may include at least one module for processing image correction for each compression quality. For example, the processor 120 may train the denoising model 230 for each compression quality, and update and manage the denoising model 230 for each compression quality, based on a training result. According to an embodiment, the processor 120 may classify a compression quality from a given image, and process image correction using the denoising model 230 corresponding to the compression quality.

The processor 120 according to various embodiments may control various operations related to a normal function of the electronic device 101 in addition to the function described above. For example, when a specific application is executed, the processor 120 may control an operation and a screen display of the application. As another example, the processor 120 may receive input signals corresponding to various touch events or proximity event inputs supported by a touch-based or proximity-based input interface, and control function operations accordingly.

According to an embodiment, at least some of the image processing module 210, the performance identification module 220, the denoising module 230, the model selection module 240, the compression quality classification module 250, the sample patch extraction module 260, and/or the user input processing module 270 may be included in the processor 120 as hardware modules (e.g., circuitry), and/or may be implemented as software including one or more instructions executable by the processor 120. For example, operations performed by the processor 120 may be stored in the memory 130 and may be executed by instructions causing, when executed, the processor 120 to operate.

According to an embodiment, the image processing module 210 may include an image encoder and an image decoder. According to an embodiment, the image processing module 210 may process encoding of an image via the image encoder. For example, the image processing module 210 may compress an image into a file having a specified compression rate (or compression level) and a designated format (e.g., mpeg, jpeg, gif, and/or png) via image encoding using the image encoder. According to an embodiment, the image processing module 210 may process, via the image decoder, decoding of an image compressed with designated encoding. For example, the image processing module 210 may reconstruct (or restore), using the image decoder, an image by decompressing an image file compressed by encoding.

According to an embodiment, the performance identification module 220 may identify performance of the denoising model 230 (or denoiser or artifact reducer) when training the denoising model 230 in the electronic device 101. According to an embodiment, the performance identification module 220 may compare an original image with a corrected (or improved) image to identify performance of the denoising model 230. For example, the performance identification module 220 may compare a peak signal-to-noise ratio (PSNR) between the original image and the corrected image so as to evaluate image quality loss information in image compression. For example, the performance identification module 220 may determine that the performance of the denoising model 230 is good when the loss is small.

According to an embodiment, the denoising model 230 may include a denoising model, a denoiser, or an artifact reducer. According to an embodiment, the denoising model 230 may represent, for example, a model to be used as a post-processing filter of the image processing module 210 (e.g., an image decoder). According to an embodiment, there may be multiple denoising models 230 (e.g., n, where n is a natural number greater than or equal to 2) for respective various compression qualities (or compression rates or compression levels) related to an image. According to an embodiment, for the denoising model 230, by using image compressed with various compression qualities in the electronic device 101, the multiple denoising models 230 corresponding to respective various compression qualities are learned and stored in the memory 130.

According to an embodiment, the model selection module 240 may select an optimum denoising model 230 to be applied to image correction (e.g., removing compression artifacts based on a compression quality) of a given image, based on at least one designated criterion. According to an embodiment, when selecting the denoising model 230, the model selection module 240 may select the denoising model 230 for applying (or configuring) a different correction strength, in consideration of at least one of a compression quality, a user's intention (or preference or taste), a type of a service or an application that provides an image, and/or a physical size (e.g., a screen size of the display module 160) of the display module 160 on which an actual image is to be displayed. According to an embodiment, model selection of the denoising model 230 will be described with reference to the following drawings.

According to an embodiment, the compression quality classification module 250 may represent a module for classifying compression quality in n levels (e.g., 13 levels, 16 levels, 50 levels, or 100 levels). For example, the compression quality classification module 250 may classify n compression qualities corresponding to n compression qualities (or compression rates or compression levels) related to an image. According to an embodiment, the compression quality classification module 250 is able to configure various levels (e.g., 13 levels, 16 levels, 50 levels, or 100 levels), based on services or applications. For example, the compression quality classification module 250 may configure X levels (e.g., 16 levels) for a first application (e.g., an image editing application) and configure Y levels (e.g., 100 levels) for a second application (e.g., a gallery application).

According to an embodiment, an input of the compression quality classification module 250 may be, for example, an image having a size of a 16×16 patch. According to an embodiment, a patch may refer to a minimum image unit enabling understanding of a compression quality of an image. For example, if a compression method for compressing an image includes dividing an image into 8×8 block units to compress the image, a patch may be configured to be an 8×8 block as well as a 10×10 block of a larger area that may include neighboring relationships of the 8×8 block. In the disclosure, for example, an area of a 16×16 size may be defined to be a patch size by adding about 4 pixels of neighboring blocks so that up to the centers of the neighboring blocks of the 8×8 block may be included. According to an embodiment, compression quality classification by the compression quality classification module 250 will be described with reference to the drawings to be described later.

According to an embodiment, the sample patch extraction module 260 (e.g., sample patch extractor) may represent a module that extracts m patches (e.g., 16×16 patches) in order to classify a compression quality of an image. According to an embodiment, the sample patch extraction module 260 may extract, for example, about 256 16×16 patches from a given image, and predict a final quality (Q) of an image by performing classification and integration on each of the extracted 256 16×16 patches. According to an embodiment, when extracting patches, the sample patch extraction module 260 may equally or randomly extract multiple patches according to a designated scheme (e.g., equally or randomly). According to an embodiment, the sample patch extraction module 260 may improve a classification speed by analyzing a partial area instead of the entire area in a given image.

According to an embodiment, the sample patch extraction module 260 may extract (e.g., equally extract or randomly extract) multiple areas in units of patches from a given image, and predict a final quality (Q) of the image by analyzing edge components of the extracted areas. For example, the sample patch extraction module 260 may analyze the edge components (e.g., parts or outlines that exist where the brightness of the image changes from a lower value to a higher value and vice versa) of the extracted areas, based on various edge detection schemes. Based on a result of the analysis, if an edge component has a value equal to or smaller than a designated threshold, the sample patch extraction module 260 may enable higher compression classification by excluding a corresponding area from calculation of an average or median value.

In an embodiment, the edge detection schemes may use various edge extraction algorithms, for example, Sobel edge extraction, Prewitt edge extraction, Roberts edge extraction, Compass edge extraction, second order derivative and Laplacian edge extraction, Canny edge extraction, and/or line edge extraction. For example, for a pattern of compression artifacts (or noise), classification by edge detection may appear more prominent around an edge component, and may be advantageous in preventing misclassification due to no pattern (e.g., a solid color patch with no pattern).

According to an embodiment, extracting sample patches from an image and classifying and integrating the same by the sample patch extraction module 260 will be described with reference to the drawings to be described later.

According to an embodiment, the user input processing module 270 may represent a module that processes a user input to identify a user's intention (or preference or taste). According to an embodiment, the user input processing module 270 may receive a user input for denoised (e.g., with compression artifacts removed) images displayed via the display module 160 in order to identify a user's preference, and provide the model selection module 240 with information on a correction strength of an image, which is selected according to the received user input. According to an embodiment, reflection of a user's intention by the user input processing module 270 will be described with reference to the drawings to be described later.

Various embodiments described in the disclosure may be implemented within a recording medium readable by a computer or a similar device by using software, hardware, or a combination thereof. According to hardware implementation, operations described in various embodiments may be implemented using at least one of application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or other electrical units for performing functions.

In various embodiments, a recording medium may include a computer-readable recording medium in which a program for execution of operations is recorded, wherein the operations include displaying a screen including at least one image via the display module 160, determining a compression quality of the at least one image, selecting a denoising model trained to correspond to the determined compression quality, processing image correction based on the selected denoising model, and displaying the corrected image via the display module 160.

The electronic device 101 according to an embodiment of the disclosure may include the display module 160, the memory 130, and the processor 120 operatively connected to the display module 160 and the memory 130, wherein the processor 120 is configured to display a screen including at least one image via the display module 160, determine a compression quality of the at least one image, select the denoising model 230 trained to correspond to the determined compression quality, process image correction based on the selected denoising model, and display a corrected image via the display module 160.

According to an embodiment, the at least one image may be a compressed image obtained by compression with a designated compression quality.

According to an embodiment, the processor 120 may classify the compression quality in units of patches of the at least one image.

According to an embodiment, the processor 120 may equally extract multiple areas from the image in the units of patches, and classify the compression quality of the image, based on an average or median value of compression qualities of the extracted areas.

According to an embodiment, the processor 120 may analyze edge components based on the extracted areas, and exclude an area, in which an edge component has a value equal to or smaller than a designated threshold, from calculation of the average or median value.

According to an embodiment, the processor 120 may classify the compression quality, based on a type of an application or service that provides the at least one image.

According to an embodiment, the processor 120 may identify the type of the application or service that provides the image, identify the corresponding designated compression quality, based on the type of the application or service, and classify the compression quality of the image, based on the designated compression quality.

According to an embodiment, the processor 120 may store, in the memory 130, the multiple denoising models 230 previously trained for each of various compression qualities, and select a denoising model trained to correspond to classification of the compression quality of the image from among the multiple denoising models 230.

According to an embodiment, the processor 120 may select the denoising model by additionally considering at least one of a user's personalization, a type of a service or application that provides an image, and/or a screen size of the display module.

According to an embodiment, the processor 120 may remove compression artifacts from the image according to a correction strength corresponding to the selected denoising model, and reconstruct the image to an original image before compression.

According to an embodiment, the processor 120 may provide, during the image correction, a user interface enabling interaction with a user in order to identify information on the image correction and the user's intention.

According to an embodiment, the processor 120 may receive a user input based on the user interface and perform post-processing of the corrected image, based on the user input.

According to an embodiment, the processor 120 may, when displaying the screen, temporarily download the image from an external device corresponding to the image, based on content execution, and provide a corrected image obtained by removing compression artifacts from the temporarily downloaded image, the removal being performed based on the denoising model trained according to the classified compression quality.

According to an embodiment, the processor 120 may display a corresponding screen based on content execution including at least one image, enlarge a user-selected image at a certain ratio and provide the same, based on the image selected on the screen by a user, and when displaying the selected image, classify a compression quality of the selected image and provide a result thereof via a pop-up message.

Hereinafter, an operation method of the electronic device 101 according to various embodiments will be described in detail. Operations performed by the electronic device 101, which will be described below, may be executed by a processor (e.g., the processor 120 of FIG. 1 or FIG. 2)

including at least one processing circuitry of the electronic device 101. According to an embodiment, the operations performed by the electronic device 101 may be stored in the memory 130, and may be executed by instructions that cause, when executed, the processor 120 to operate.

Figure 3:
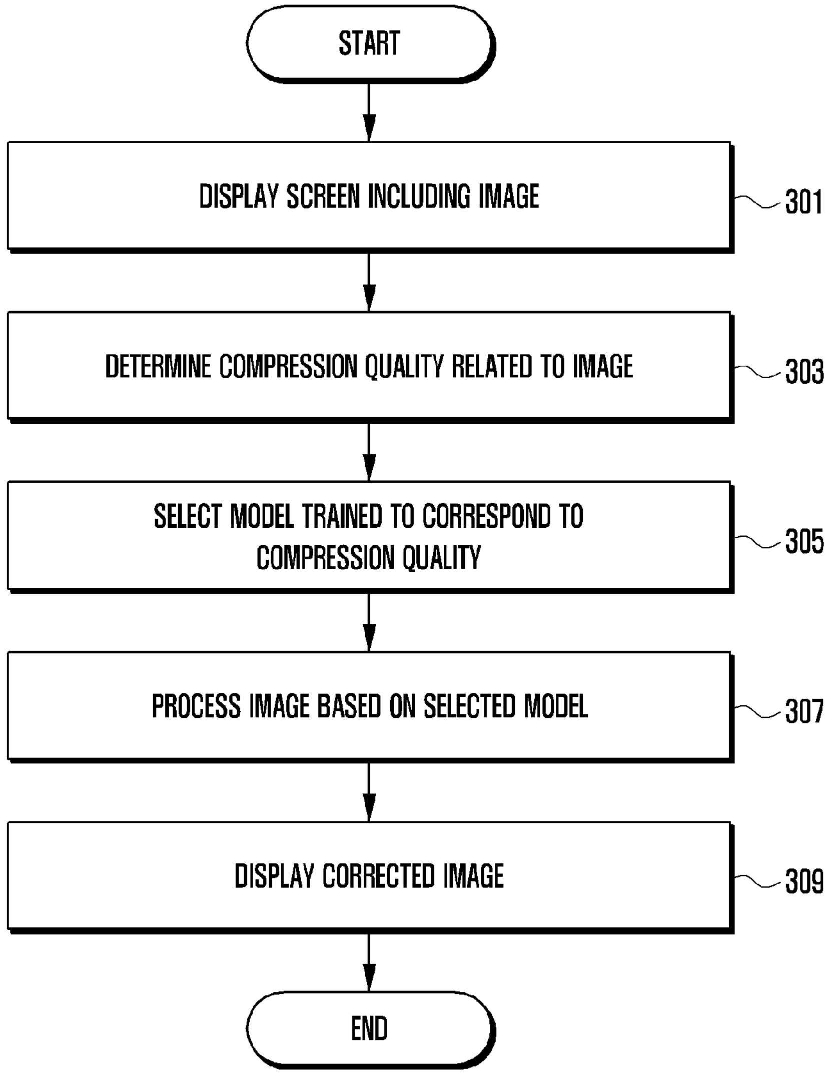
FIG. 3 is a flowchart illustrating an operation method of the electronic device according to an embodiment.

FIG. 3 is a flowchart illustrating an operation method of the electronic device according to an embodiment.

Referring to FIG. 3, in operation 301, the processor 120 of the electronic device 101 may display a screen including an image. According to an embodiment, the processor 120 may visually provide an image and/or contents including an image via the display module 160. According to an embodiment, the processor 120 may control, based on a user input, the display module 160 to display a screen including an image stored in the memory 130 of the electronic device 101 and/or an image received from an external device. According to an embodiment, the image may represent a compressed image compressed with a designated compression quality (or compression rate or compression level).

In operation 303, the processor 120 may determine a compression quality related to the image. According to an embodiment, the processor 120 may classify a compression quality (e.g., a compression rate) for each of at least one given image.

According to an embodiment, when classifying the compression quality, the processor 120 may extract and analyze designated m (e.g., about 256) patches in units of compression patches (e.g., 8×8 pixels, 16×16 pixels, or 64×64 pixels) instead of the entire area of the given image. Based on this, the processor 120 may identify, as it is, a characteristic of a codec for compression of the given image in units of patches, and may stochastically evenly identify the entire image. According to an embodiment, when classifying the compression quality, the processor 120 may extract multiple (e.g., designated m) patches from the given image and analyze edge components of the extracted patches. For example, the processor 120 may analyze edge components of the extracted patches, based on various edge detection schemes, and classify the compression quality by excluding a patch, in which an edge component has a value equal to or smaller than a designated threshold, from calculation of an average or a median value.

According to an embodiment, the processor 120 may determine the compression quality via classification learning and prediction of the given image in units of patches (e.g., an 8×8 patch unit, a 16×16 patch unit, or a 64×64 patch unit). For example, image compression may be performed in units of patches, and classification may be thus possible in an 8×8 patch unit, a 16×16 patch unit, or a 64×64 patch unit (e.g., HEVC) at the maximum. Based on this, the processor 120 may prevent a calculation error due to overall image characteristics, by concentrating on a corresponding patch that is a unit in which compression occurs. In addition, since the size of the input image of calculation for determining the compression quality is small, the processor 120 may avoid, using an existing pooling layer, an operation that may unnecessarily widen a receptive field and reduce accuracy.

According to an embodiment, since an area (e.g., for a black part of the image, an area having a similar characteristic regardless of compression) that cannot clearly reflect a compression rate may occur due to a characteristic of the image, the processor 120 may extract (e.g., extract about 256 patches) various areas of the image and perform classification using an average or median value of respective compression qualities (or scores) of the extracted areas.

According to an embodiment, when calculating the average or median value of the respective compression qualities (or scores) of the extracted areas, the processor 120 may analyze edge components of the extracted areas so as to exclude an area, in which an edge component has a value equal to or smaller than a designated threshold, from calculation of the average or median value. For example, for a pattern of compression artifacts (or noise), classification by edge detection may appear more prominent around an edge component, and may be advantageous in preventing misclassification due to no pattern (e.g., a solid color patch with no pattern).

According to an embodiment, when classifying the compression quality, the processor 120 may classify the compression quality based on a type of a service (or application) that provides the given image. For example, each service (e.g., a messenger service or a portal service) (or application) may provide, to the electronic device 101, the image with its own (or designated) compression quality so as to save storage in a cloud environment and minimize delay in image transmission. For example, <Table 1> below may indicate examples of JPEG compression qualities provided by respective services (or applications). In <Table 1>, the higher value of the compression quality may indicate the better quality. According to an embodiment, the processor 120 may identify the type of service (or application) that provides (or executes) the given image in the electronic device 101, and classify a corresponding compression quality based on the type of service.

TABLE 1

| Services Types | First service (e.g., messenger) | Second service (e.g., Youtube thumbnail) | Third service (e.g., Kakao Talk) | Fourth service (e.g., Google Photo) |
|---|---|---|---|---|
| Compression Quality | about 70 | about 70 | about 90: Standard about 95: High | about 85, about 80, about 70, and about 60 (Variably applied depending on images) |

In operation 305, the processor 120 may select a model (e.g., a noise removal model or a denoising model) trained to correspond to the compression quality. For example, the processor 120 may identify, in advance, the compression quality used in the service (or application) providing the image, and when the electronic device 101 uses the service (or application), the denoising model trained with the compression quality may be used.

According to an embodiment, the processor 120 may select the denoising model trained to correspond to the compression quality of the image from among the multiple denoising models 230, which are previously trained for each of various compression qualities, in the memory 130. According to an embodiment, with respect to the given image, the processor 120 may select a first denoising model corresponding to classification of a first compression quality when classification is performed with the first compression quality. With respect to the given image, the processor 120 may select a second denoising model corresponding to classification of a second compression quality when classification is performed with the second compression quality. With respect to the given image, the processor 120 may select a third denoising model corresponding to classification of a third compression quality when classification is performed with the third compression quality.

According to an embodiment, when selecting the denoising model trained to correspond to the compression quality, the processor 120 may select the denoising model by further considering at least one of a user's intention (or preference or taste), a type of a service or application providing an image, and/or a physical size (e.g., a screen size of the display module 160) of the display module 160 on which the actual image is to be displayed.

In operation 307, the processor 120 may perform image processing based on the selected model. According to an embodiment, the processor 120 may process image correction using the denoising model selected based on the compression quality of the image from among the multiple denoising models 230. According to an embodiment, the processor 120 may remove compression artifacts (or noise) from the given image according to a correction strength corresponding to the selected denoising model, and reconstruct the given image (e.g., the compressed image) to an original image before compression.

In operation 309, the processor 120 may display the corrected image. According to an embodiment, the processor 120 may control the display module 160 to display a corrected state, based on the denoising model corresponding to at least one given image. According to an embodiment, displaying of the corrected image in operation 309 may include transmitting or storing the corrected image or may be replaced with transmitting or storing the corrected image.

Figure 4:
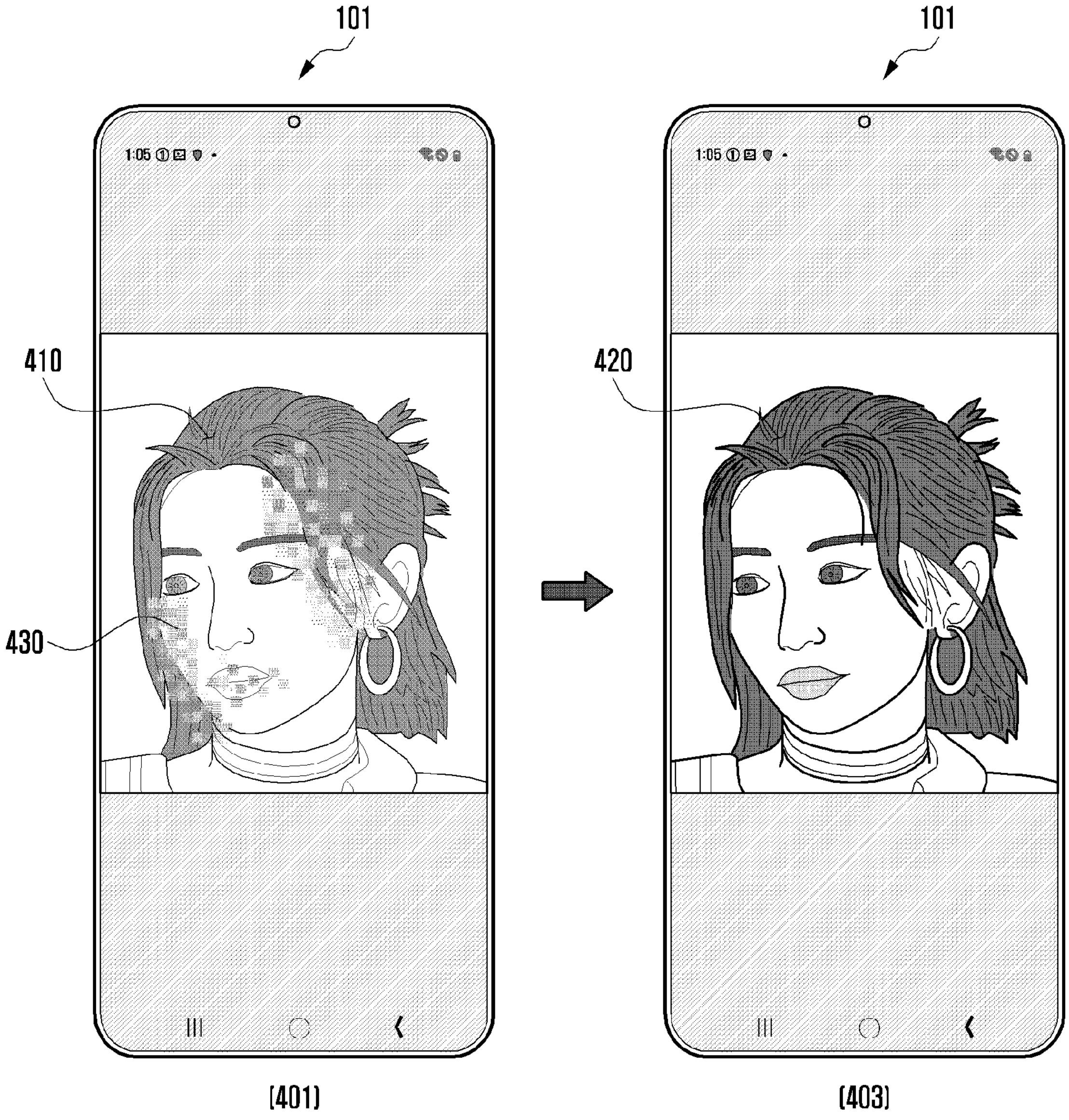
FIG. 4 is a diagram illustrating an example of image correction in the electronic device according to an embodiment.

FIG. 4 is a diagram illustrating an example of image correction in the electronic device according to various embodiments.

As illustrated in FIG. 4, example screen <401> may represent an example in which a compressed image 410 (e.g., a given image) before image correction according to a compression quality is provided, and example screen <403> may represent an example in which a corrected image 420 (e.g., a reconstructed image) after image correction according to the compression quality is provided.

According to an embodiment, in the example of FIG. 4, example screen <401> may show that the compression quality of the given image (e.g., the compressed image 410 obtained by compression with a designated compression quality) is, for example, a JPEG quality level (e.g., about 80). According to an embodiment, in the example of FIG. 4, example screen <403> shows an example in which the electronic device 101 classifies (or predicts) that the image 410 is of a JPEG quality level (e.g., about 80), and applies (e.g., image correction) an improvement algorithm (e.g., a denoising model) trained to correspond to the classified compression quality (e.g., a quality level: about 80).

According to an embodiment, an image provided to the electronic device 101 is mostly compressed with a certain compression quality (or compression rate) and then transmitted, and the electronic device 101 may receive the compressed image from an external device (or network). As illustrated in example screen <401>, such a compressed image may generate unique artifacts (e.g., an element 430 part in example screen <401>) depending on a compression quality. For example, various methods, such as various sampling (e.g., chroma subsampling), block sizes, and/or quantization (e.g., discrete cosine transform (DCT) coefficient quantization) may be used to lower a compression quality (e.g., a bit rate), and the image may be further compressed with more various compression quality control methods (e.g., a bit rate control method).

According to an embodiment, the electronic device 101 may learn patterns of unique artifacts (or noise) appearing in a corresponding compression quality in learning data (e.g., images with different compression qualities) including various compression qualities, and train, via a deep neural network, multiple models (e.g., denoising models) for removing the artifacts. In an embodiment, the deep neural network may represent an artificial neural network (ANN) including multiple hidden layers between an input layer and an output layer.

According to an embodiment, the deep neural network may learn various nonlinear relationships including multiple hidden layers, and is used as a core model for deep learning. According to an embodiment, the deep neural network may include, according to an algorithm, a deep belief network (DBN) and a deep auto-encoder which are based on an unsupervised learning method, a convolutional neural network (CNN) for processing two-dimensional data, such as an image, and/or a recurrent neural network (RNN) for processing time-series data.

Accordingly, in various embodiments, a denoising model optimized for each compression quality may be matched, and artifacts (or noise) (e.g., the element 430) may be removed by applying a denoising model corresponding to the compression quality. According to an embodiment, the electronic device 101 may classify artifacts according to a compression quality via learning data, and automatically analyze patterns of artifacts so as to remove even unique artifacts corresponding to the compression quality.

According to an embodiment, the electronic device 101 may identify a compression quality of a given image (e.g., the compressed image 410 of example screen <401>), and apply a denoising model trained for artifacts (or noise) of the compression quality so as to provide a user with an image (e.g., the reconstructed image 420 of example screen <403>) from which artifacts have been removed.

Figure 5:
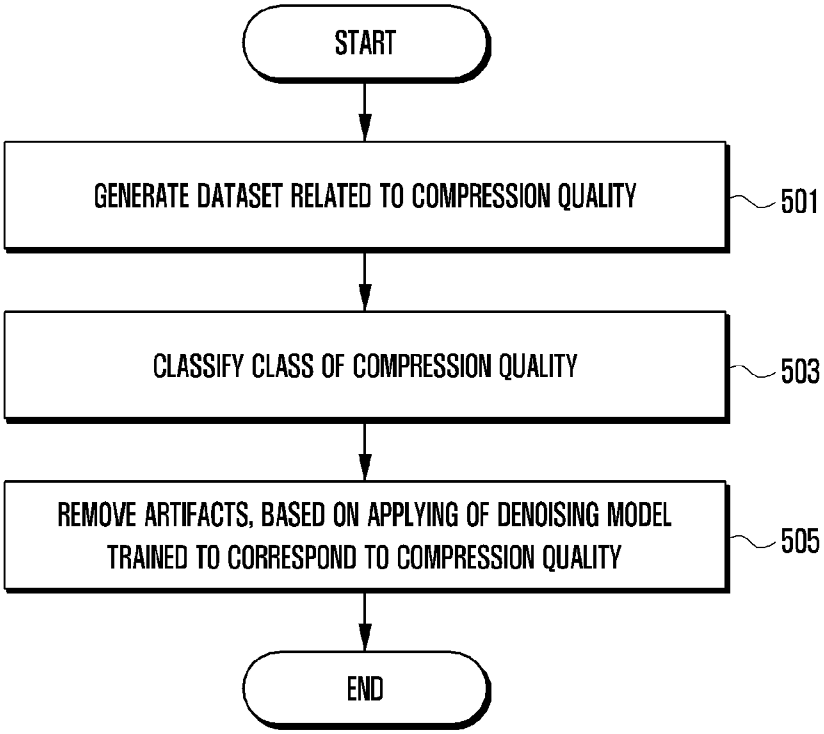
FIG. 5 is a flowchart illustrating an example of learning, classification, and removal operations for image correction in the electronic device according to an embodiment.

FIG. 5 is a flowchart illustrating an example of learning, classification, and removal operations for image correction in the electronic device according to an embodiment.

Referring to FIG. 5, in operation 501, the processor 120 of the electronic device 101 may generate a dataset including compression qualities of multiple classes. According to an embodiment, the processor 120 may generate a dataset including compression qualities of n classes. For example, an image dataset may be required to generate a machine learning model in the electronic device 101. In an embodiment, an image dataset may be prepared using, for example, the image processing module 210 of FIG. 2 (e.g., the image encoder). For example, the processor 120 may prepare compressed images of n qualities, by variously configuring quality options of n classes for the image encoder. For example, a library application for implementation of JPEG format encoding may provide encoding qualities of, for example, 100 compression levels from 1 to 100, and the image editing application may provide encoding qualities of, for example, 13 compression levels from 1 to 13.

According to an embodiment, the processor 120 may train, for example, the compression quality classification module 250 (e.g., the compression quality classifier) of FIG. 2 based on the dataset. According to an embodiment, the processor 120 may configure images compressed with various qualities to be "input X" and configure the qualities used when generating respective compressed images to be "ground truth output Y" (e.g., label or mark).

According to an embodiment, the processor 120 may train, for example, the denoising model 230 (e.g., the artifact reducer) of FIG. 2. According to an embodiment, the processor 120 may configure images compressed with various qualities to be "input X" and configure an original image to be "ground truth output Y". According to an embodiment, unlike the compression quality classification module 250, the denoising model 230 may indicate an image having a label that is not an integer.

In operation 503, the processor 120 may classify a compression quality class. According to an embodiment, the processor 120 may perform training (learning) to classify a compression quality class. According to an embodiment, the processor 120 may use various machine learning methods as a method for classifying a compression quality class, for example, the compression quality classification module 250 may be implemented with a convolutional neural network (CNN). For example, the processor 120 may train a CNN model with data obtained by decoding various compressed image qualities by the image processing module 210 (e.g., the image decoder) on the dataset generated in operation 501, so that, when a random image is given in the electronic device 101, the processor 120 may predict a compression quality of the image.

The machine learning method according to an embodiment is not limited to a CNN model, and various machine learning methods available for classification and improvement of a compression quality may be used. For example, as machine learning methods, various machine learning methods, such as a deep belief neural network (DBN), a deep auto-encoder, a convolutional neural network (CNN), and/or a recurrent neural network (RNN), may be included.

According to an embodiment, the processor 120 may infer a compression quality of the image. According to an embodiment, when the electronic device 101 classifies compression quality classes, the processor 120 may not check all patches of the image, may extract, for example, about 256 16×16 patches by using, for example, the sample patch extraction module 260 (e.g., the sample patch extractor) of FIG. 2, and may predict a final quality Q of the image by classifying and integrating the respective 256 extracted patches. According to an embodiment, when predicting the final quality Q based on the extracted areas, the processor 120 may analyze edge components of the extracted areas, and exclude an area, in which an edge component has a value equal to or smaller than a designated threshold, from calculation of an average or median value, thereby predicting the final quality Q. According to various embodiments, the processor 120 may rapidly improve a classification speed by analyzing a part of the image instead of the entire image.

In operation 505, the processor 120 may remove artifacts, based on applying of the denoising model trained to correspond to the compression quality. According to an embodiment, with respect to the given image, the processor 120 may remove artifacts by applying an improved strength (denoising strength) trained to correspond to a corresponding compression quality.

According to an embodiment, the processor 120 may perform learning to determine the denoising model corresponding to the compression quality. According to an embodiment, the processor 120 may generate, for example, n denoising models 230, like the number of compression quality classifications. According to an embodiment, in order to reduce the number of the denoising models 230, the processor 120 may generate the denoising models 230 by, for example, performing quantization with, for example, fewer than n numbers. As an example, the processor 120 may perform quantization with, for example, about 8 qualities (e.g., compression qualities of 20, 30, 40, 50, 60, 70, 80, and 90) among about 100 compression qualities.

According to an embodiment, the processor 120 may generate a training model so that a compressed image generated via quantization may be corrected to an original image in units of 8×8 patches. According to an embodiment, the processor 120 may configure an input size to be a patch having a size of 16×16 pixels, so that at least some areas of neighboring blocks are also considered. For example, the processor 120 may prevent sudden changes in texture and/or color of a specific block with respect to neighboring blocks.

According to an embodiment, the processor 120 may determine an appropriate denoising model 230, based on a quality (e.g., the final quality Q) predicted via the compression quality classification module 250, and remove compression artifacts due to lossy image compression, by applying the determined denoising model 230 to image correction.

Figure 6:
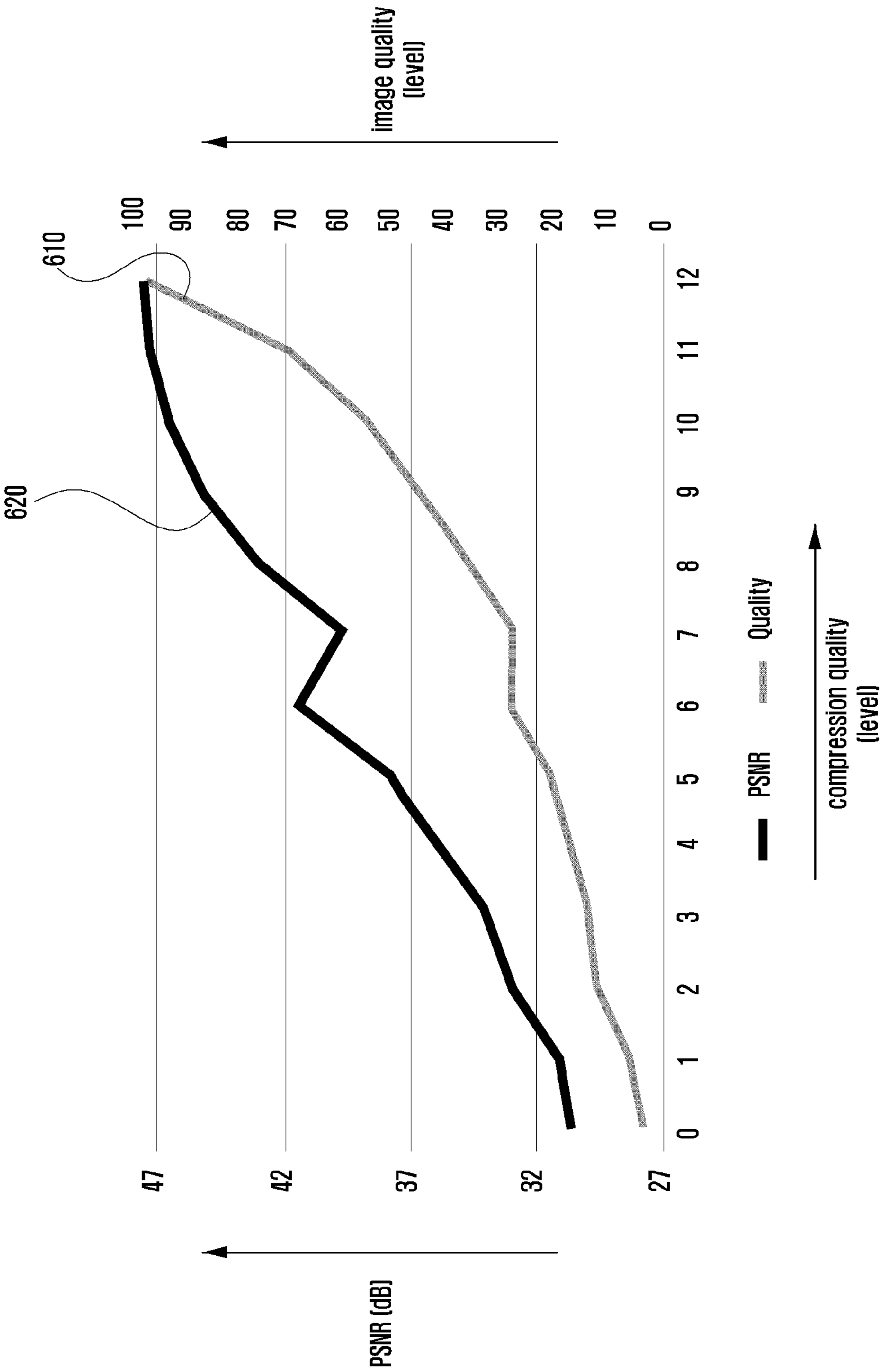
FIG. 6 is a diagram illustrated to describe the generality of a compression quality of an image according to an embodiment.

FIG. 6 is a diagram illustrated to describe the generality of a compression quality of an image according to an embodiment.

According to an embodiment, as described above, with respect to numerical values of compression qualities, for example, from 1 to 100, an actual compression rate (or quantization step size and/or the number of subsampling) may vary depending on an image encoder, an application, and/or a service. However, although numerical values representing compression qualities are different depending on an image encoder type, if qualities between a highest compression rate and an optimal compression rate are equally learned in one image encoder, there may be, as a result, as illustrated in FIG. 6, a point at which a compression quality is similar to that of another image encoder, and image quality may be improved accordingly.

According to an embodiment, FIG. 6 may illustrate an example of a first application (e.g., a gallery application) and a second application (e.g., an image editing application) which provide different compression quality levels. According to an embodiment, as a method of providing different levels of compression qualities, a method of varying a quantization step for a DCT coefficient and/or a method of varying subsampling of a chroma area may be included. The example of FIG. 6 may show a result of comparing numerical values by applying the compression quality classification module 250 trained in a first image encoder (e.g., an encoder applied to the first application (e.g., the gallery application) to an image generated by a second image encoder (e.g., an encoder applied to the second application (e.g., the image editing application), wherein the first image encoder provides 100 JPEG quality levels from 1 to 100, and the second image encoder provides qualities of 13 levels from 0 to 12.

According to an embodiment, based on the comparison, it may be identified whether there is a correlation between a first image (e.g., qualities from 1 to 100) generated by the first image encoder and a second image (e.g., qualities from 0 to 12) generated by the second image encoder. For example, when there is a correlation between the first image and the second image, a corresponding denoising model 230 may be generated by measuring qualities in only one image encoder (e.g., a JPEG encoder).

According to an embodiment, referring to FIG. 6, the vertical axis (e.g., Y axis) in FIG. 6 may indicate 100-level qualities of the first image encoder from 1 to 100, and the horizontal axis (e.g., X axis) may indicate 13-level qualities of the second image encoder from 0 to 12. According to an embodiment, in FIG. 6, a graph of an element 610 may indicate a peak signal-to-noise ratio (PSNR) change, and a graph of an element 620 may indicate a quality change.

Referring to FIG. 6, according to a comparison result, as illustrated via the graph 620, it may be identified that, when a quality of the second image encoder increases from 0 to 12, a measurement value of the compression quality classification module 250 trained in the first image encoder also increases in proportion from about 17 to about 99. For example, there may be a correlation between qualities of different levels of two different encoders. As identified via the experiment of FIG. 6, even if training is performed in one encoder (e.g., a JPEG encoder), it may be seen that various other encoders are also supportable.

As described above, in images provided from the electronic device 101 and/or an external device (e.g., a server or another electronic device), unique artifacts (or noise) may be generated depending on a compression quality. For example, for images, various sampling (e.g., chroma subsampling), block sizes, and/or quantization (e.g., DCT coefficient quantization) methods may be used to lower compression quality information (e.g., bit rate information), and more various compression quality control methods (e.g., a bit rate control method) may be additionally used depending on a compression codec.

In various embodiments, patterns of unique artifacts (or noise) appearing in a corresponding compression quality in learning data (e.g., images with different compression qualities) including various compression qualities may be learned, and multiple denoising models to remove the artifacts may be trained via a deep neural network. Accordingly, the electronic device 101 may be able to perform artifacts removal more optimized for the corresponding compression quality compared to, for example, noise improvement based on a conventional blur filter strength. According to various embodiments, the electronic device 101 may classify artifacts according to a compression quality via learning data, and analyze patterns of the artifacts so as to remove even unique artifacts corresponding to the compression quality. According to an embodiment, the electronic device 101 may use the trained compression quality classification module 250 to select one denoising model that is most suitable for a compression quality of a given image from among multiple pre-trained denoising models.

According to an embodiment, the electronic device 101 may propose a new correction strength by using multiple (e.g., n) denoising models. According to an embodiment, the electronic device 101 may apply a denoising model trained for each compression quality. According to an embodiment, the electronic device 101 may apply a denoising model according to an optimization issue and/or context of the deep neural network. For example, the electronic device 101 according to various embodiments may propose a new correction strength that may cover artifacts for each of various compression qualities at once, by using a quantized denoising model trained on the most similar compression quality class. For example, a numerical value of the new correction strength may be an index of a denoising model trained with various compression qualities. The electronic device 101 according to various embodiments may configure the new correction strength with one value, based on the index of the denoising model.

According to an embodiment, the electronic device 101 may generate learning data by naming, as a specific compression quality class, an image having a different compression quality. According to various embodiments, the electronic device 101 may learn, using various denoising models, not only a method of classifying a compression level (or class) of a corresponding compression quality, but also a method of removing corresponding artifacts in the learning data. Based on this, when a specific image is given, the electronic device 101 may apply a decompression method suitable for a corresponding compression quality. In addition, the electronic device 101 may use a class or index of various decompression methods to quantize a noise correction strength expressed with a complex parameter so as to express the same.

According to an embodiment, the electronic device 101 may resolve unique artifacts that may appear only in each compression level of learning data, which is acquired while lowering a compression level (e.g., a compression quality (e.g., a bit rate)). For example, the electronic device 101 may specifically learn the corresponding compression level, identify compression artifacts which may appear in the compression level, and reversely correct the same.

According to an embodiment, the electronic device 101 may provide a beauty effect and/or an edge preserving smoothing (e.g., eliminating blemishes while maintaining a strong edge) effect which are obtained by applying a deep neural network, in which correction learning has been performed at a low correction strength (e.g., a compression level), to an image of a different correction strength. According to an embodiment, the electronic device 101 may increase an enhancement processing strength by applying, to another strength, a model for performing correction to an original quality from each different compression correction strength. According to various embodiments, the electronic device 101 may adjust the correction strength by learning multiple deep neural networks for reconstruction of learning data, which is acquired while lowering the compression level, to the original quality. In addition, according to various embodiments, during image correction, the electronic device 101 may support readjustment of the correction strength according to a user or various contexts.

According to an embodiment, more optimized image correction may be provided using a denoising model accurately trained for each of various compression qualities (e.g., noise levels). According to various embodiments, as described above, in addition to the new correction strength, an artifact removal level may be determined by considering various contexts in a complex manner. In various embodiments, a more optimized denoising model may be determined and artifacts may be removed, in consideration of user characteristics (e.g., a user's personalization), characteristics (e.g., a screen size of the display module 160) of the electronic device 101 displaying an image, and/or a context in which an image is displayed (e.g., application (or service) characteristics).

According to an embodiment, an image (e.g., a corrected (or enhanced) image), from which artifacts have been removed due to applying of a denoising model determined by the electronic device 101, may not be visually optimal for a user depending on the user's taste, the context of the electronic device 101, and/or the purpose of a service. For example, a user may desire stronger correction that can make blemishes of the user's face disappear, compared to an original image exposing the user's face as it is. For another example, in spite of an image having the same compression quality, a correction strength may need to be different when the image is displayed on an electronic device with a large screen and when the image is displayed on an electronic device with a small screen.

In an embodiment, an appropriate correction strength (or improvement factor) may be provided to be selected, via a post-processing application method suitable for the user's taste, the screen size of the display module 160 of the electronic device 101 (e.g., stronger post-processing may be required when displaying an image on the display module 160 of a large screen), and/or a provided service (e.g., application). In various embodiments, instead of providing a fixed post-processing enhancement strength based only on an image, the enhancement strength may be additionally configured (adjusted) so as to be provided according to various conditions.

According to various embodiments, with respect to an image primarily corrected by the electronic device 101 as described above, the electronic device 101 may perform operation adaptively without fixing the post-processing enhancement strength, by comprehensively applying a post-processing filter according to a user's personalization, the screen size of the electronic device 101, and/or characteristics of an application (or service). According to an embodiment, an image preferred by a user may not be an image close to reality. For example, an image preferred by a user may be an image that is good for the user's eyes even though the image is different from an original image. Accordingly, in various embodiments, a compression noise correction strength may be provided so that a different correction strength may be applied (or configured) according to a user's taste (or intention), a characteristic of a service for providing an image, and/or the physical size of the display module 160 on which an actual image is to be displayed.

Hereinafter, descriptions will be provided for an operation scenario of naturally providing a user with guidance on an image state and improvement method, while enabling an appropriate improvement factor (or strength) to be selected via a post-processing application method suitable for the user's taste. For example, the electronic device 101 may process additional image correction based on a user's intention.

Figure 7:
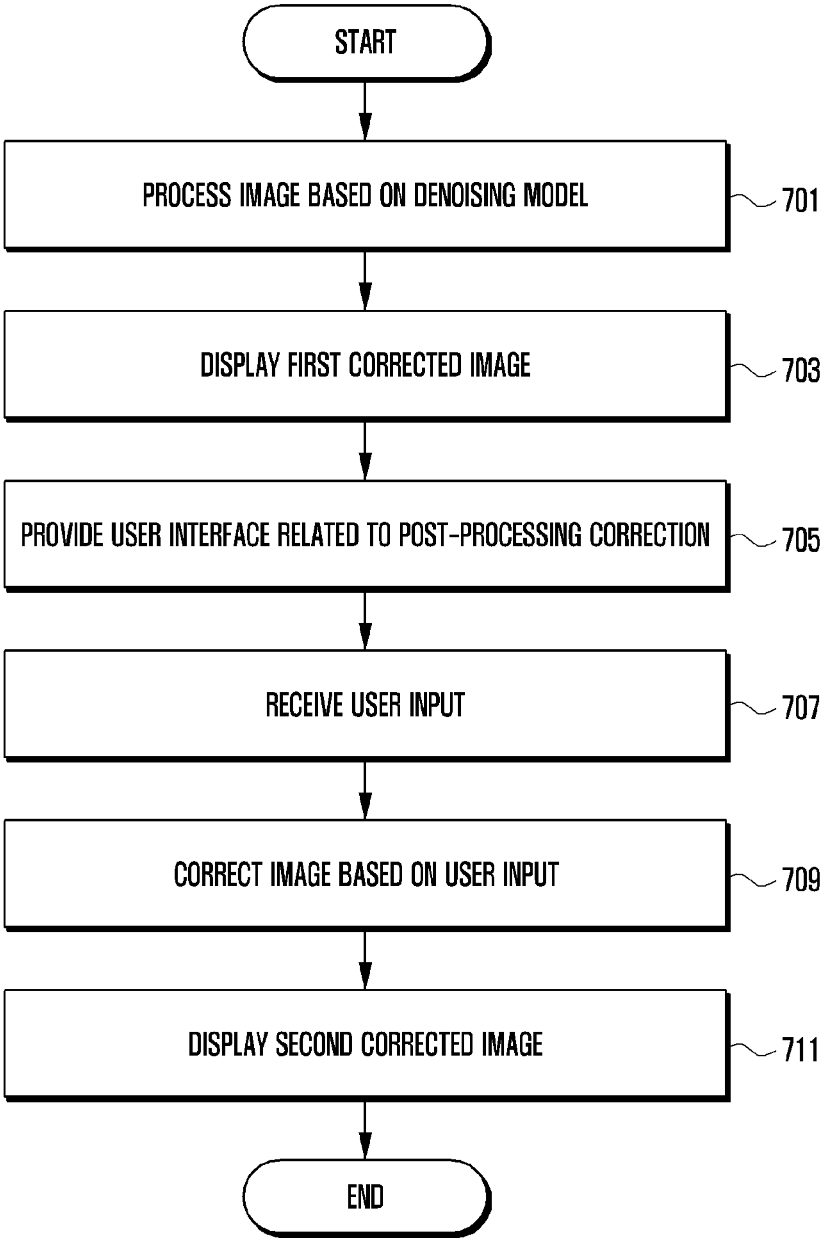
FIG. 7 is a flowchart illustrating an operation method of the electronic device according to an embodiment.

FIG. 7 is a flowchart illustrating an operation method of the electronic device according to an embodiment.

Referring to FIG. 7, in operation 701, the processor 120 of the electronic device 101 may process an image, based on a denoising model. According to an embodiment, the processor 120 may perform reconstruction to an original image by removing compression artifacts (or noise) from a given image (e.g., a compressed image).

In operation 703, the processor 120 may display a first corrected image. According to an embodiment, the processor 120 may display the original image (or reconstructed image) from which compression artifacts have been removed based on applying of the denoising model.

In operation 705, the processor 120 may provide a user interface related to post-processing correction. According to an embodiment, when displaying the first corrected image, the processor 120 may control the display module 160 to display the user interface for post-processing correction of the image of the user, by overlapping with the first corrected image or via a pop-up window.

In operation 707, the processor 120 may receive a user input. According to an embodiment, the processor 120 may detect a user input for selecting an option to be applied to post-processing correction, based on the user interface.

In operation 709, the processor 120 may correct the image, based on the user input. According to an embodiment, the processor 120 may correct the image, based on an option corresponding to the user input.

In operation 711, the processor 120 may display a second corrected image. According to an embodiment, via post-processing correction on the first corrected image according to the option corresponding to the user input, the processor 120 may control the display module 160 to display the second corrected image that is transformed from the first corrected image.

Figure 8:
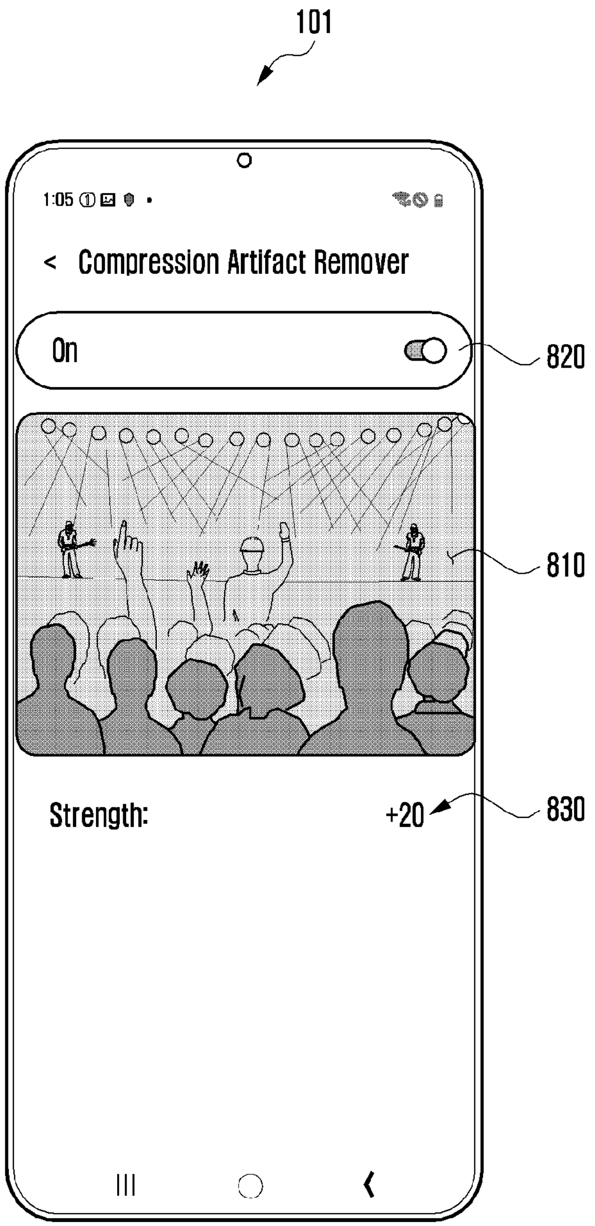
FIG. 8 is a diagram illustrating an example of a user interface for providing post-processing correction based on an interaction with a user in the electronic device, and an operation method therefor according to an embodiment.
Figure 9:
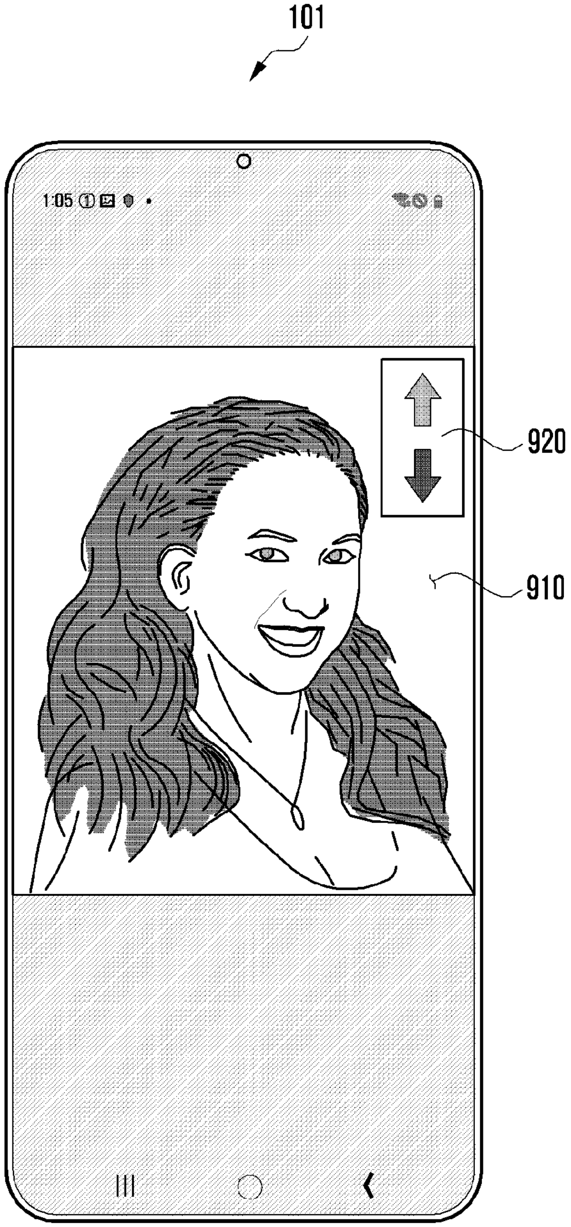
FIG. 9 is a diagram illustrating an example of a user interface for providing post-processing correction based on an interaction with a user in the electronic device, and an operation method therefor according to an embodiment.
Figure 10:
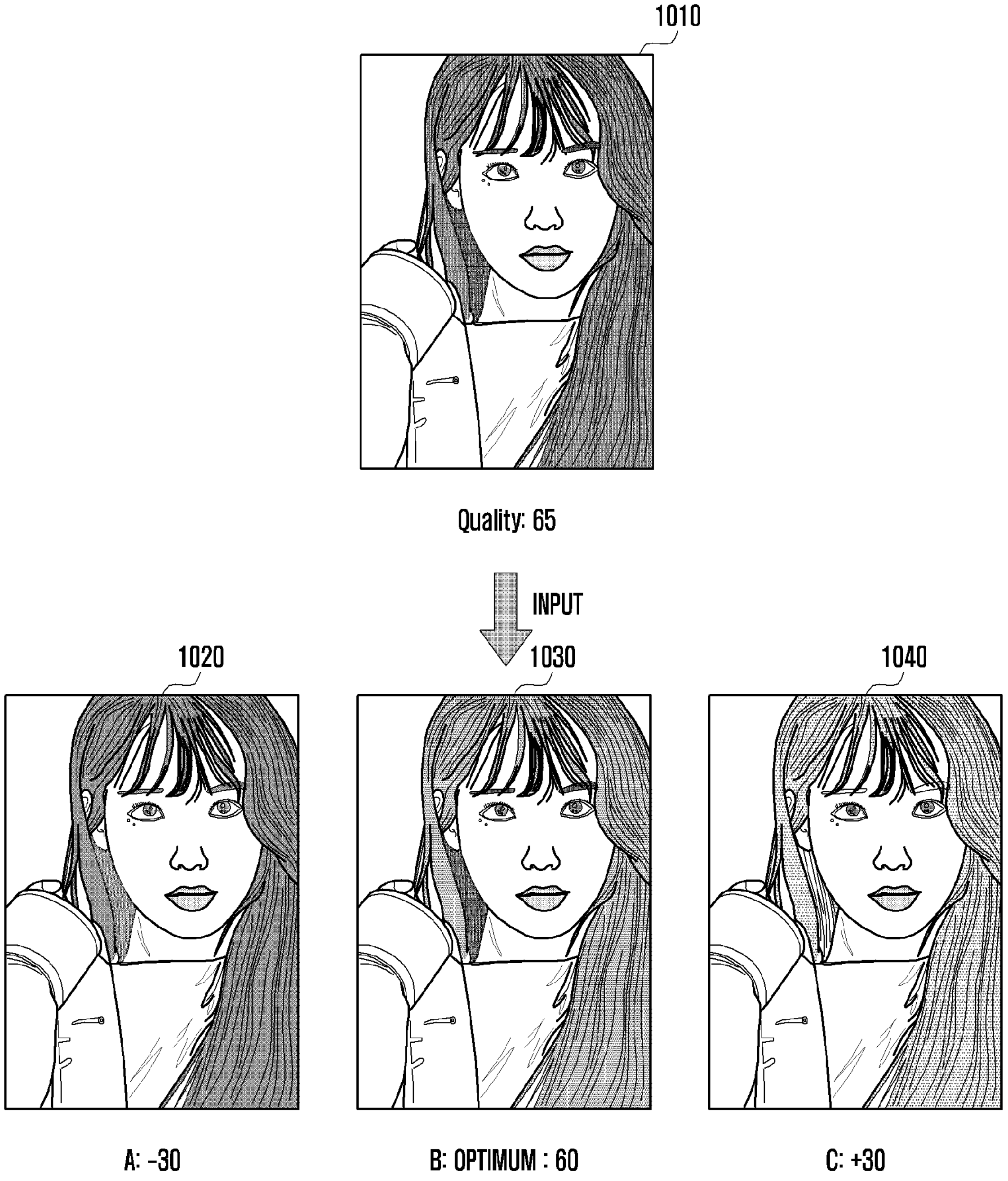
FIG. 10 is a diagram illustrating an example of a user interface for providing post-processing correction based on an interaction with a user in the electronic device, and an operation method therefor according to an embodiment.

FIG. 8, FIG. 9, and FIG. 10 are diagrams illustrating examples of a user interface for processing image correction according to a user's intention in the electronic device, and an operation thereof according to an embodiment.

Referring to FIG. 8, FIG. 8 may show an example of a configuration enabling application of post-processing correction to the entire system of the electronic device 101 according to a user's intention. According to an embodiment, as illustrated in FIG. 8, the electronic device 101 may provide a selection menu 820 enabling configuration (e.g., execution) for compression artifacts on a screen 810 on which an image is displayed. According to an embodiment, when the compression artifact configuration is enabled via the selection menu 820, the electronic device 101 may adjust the strength of removing corresponding artifacts from the image to be relatively different from an original level. According to an embodiment, the electronic device 101 may also provide information 830 (or correction strength) (e.g., strength: +20) related to actual image correction according to the correction strength, on the screen 810 on which the image is displayed.

Referring to FIG. 9, FIG. 9 may show an example of a configuration enabling, with respect to an image (e.g., an image which has been transformed from a compressed image obtained by compression according to a designated compression quality to an original image by removal of compression artifacts due to the compression quality) having been primarily corrected (e.g., pre-processing corrected), secondary correction (e.g., post-processing correction) to be applied on the image according to a user's intention (or taste) in the electronic device 101. According to an embodiment, as illustrated in FIG. 9, the electronic device 101 may provide a designated adjustment menu 920 for image correction by a user via a designated area (e.g., an upper right area of the screen, a center area of the screen, a lower center area of the screen, or an upper left area of the screen) of the screen 910 on which the image is displayed. According to an embodiment, the electronic device 101 may process designated image correction related to the adjustment menu 920, based on a user input using the adjustment menu 920.

According to an embodiment, when providing a primarily corrected image, the electronic device 101 may provide the adjustment menu 920 and information on a correction result (e.g., a guidance message, such as "The image has a compression quality of 60. Do you want further correction?") for the primarily corrected image. According to an embodiment, the electronic device 101 may guide the user to adjust the correction strength via the adjustment menu 920.

Referring to FIG. 10, FIG. 10 may show an example of a configuration of displaying secondarily processed (e.g., post-processed) multiple sample images based on a primarily corrected (e.g., pre-processed) image, and then enabling a user to select an intended image in the electronic device 101.

According to an embodiment, when displaying a screen for correction, in order to clearly show a degree of improvement in the compression quality to the user, the electronic device 101 may provide, when the improvement is in progress, a face part, a person (e.g., whole body) part, a salient part, and/or a part with the greatest difference in PSNR before and after improvement.

According to an embodiment, as illustrated in FIG. 10, the electronic device 101 may display a pop-up message (not illustrated) indicating that a compression quality of an image 1010 is poor, and images 1020, 1030, and 1040 that are improved with various strengths, and may enable the user to select one of the displayed images 1020, 1030, and 1040. According to an embodiment, when providing the primarily corrected image 1010 (e.g., compression quality: 65), the electronic device 101 may display information on a correction result (e.g., a guidance message, such as "The image has a compression quality of Do you want further correction?") for the primarily corrected image 1010. According to an embodiment, after displaying the information on the correction information, the electronic device 101 may, in response to the user input, as illustrated in FIG. 10, provide (e.g., display) the user with the images 1020, 1030, and 1040, to which different correction strengths have been pre-applied, and enable a user to select a correction strength.

According to an embodiment, such as the first sample image 1020 (e.g., compressed quality: −30), the second sample image 1030 (e.g., compressed quality: 60), and the third sample image 1040 (e.g., compression quality: +30), the electronic device 101 may provide the user with multiple images (e.g., secondarily corrected images) to which correction strengths different from the correction strength of the primarily corrected image 1010 have been applied, based on the primarily corrected image 1010.

According to an embodiment, as illustrated in FIG. 8, FIG. 9, and/or FIG. 10, the electronic device 101 may apply and manage, as a default configuration, a correction level selected (or configured) according to the user's intention based on the user input. For example, the electronic device 101 may manage the correction level selected according to the user's intention so that image correction is processed by additionally considering the correction level reflecting the user's intention in subsequent learning and/or subsequent correction. For example, when determining a denoising model according to a compression quality, the electronic device 101 may adjust a correction strength by referring to a history configured according to the user's intention (or personalization) for the compression quality.

According to an embodiment, the electronic device 101 may configure the correction strength differently in consideration of various contexts (e.g., an application type, another user's preference, and/or the screen size of the display module 160) in addition to the contexts illustrated in FIG. 8, FIG. 9, and/or FIG. 10.

According to an embodiment, the electronic device 101 may configure a different correction strength for each application (or service). According to an embodiment, each application (or service) providing images may provide images of different compression qualities. For example, it may be necessary to apply an intensive correction strength to give a beauty effect in a specific application (e.g., a photographing application). For another example, it may not be necessary to apply an intensive correction effect in another specific application (e.g., a news application). Accordingly, in various embodiments, correction with a different compression quality (or compression level) may be performed for each application (or service).

According to an embodiment, for a given image, the electronic device 101 may configure different correction strengths for the image by using configuration values of other users. For example, images related to public figures (e.g., celebrities) may be disseminated to various electronic devices across multiple sites, and there may be various samples that different users of various electronic devices have configured by applying correction strengths to the images. According to an embodiment, if a given image is an image that may be commonly shared by many other users, such as an image of a celebrity, when removing compression artifacts of the image, the electronic device 101 may perform correction by acquiring an optimal correction level, which is preconfigured by other users, from an external source (e.g., a server or another electronic device).

According to an embodiment, the electronic device 101 may differentially configure a different correction strength according to the screen size of the display module 160 that displays an image. According to an embodiment, for an image compressed with the same compression quality, the electronic device 101 may perform correction with different correction strengths in an electronic device having a small screen size and an electronic device having a large screen size. For example, the electronic device 101 may perform correction with different correction strengths by applying different denoising models according to the screen size of the display module 160. According to an embodiment, the electronic device 101 may configure a more intensive correction strength when displaying an image on the display module 160 of a large screen.

According to an embodiment, when a given image is a video, the electronic device 101 may configure a correction strength in units of frames of consecutive images of the video, rather than applying a correction strength to a single image. For example, for a video, the total number of classification operations may be reduced by, for example, measuring a compression quality once every K frames (e.g., 3 frames, 4 frames, or 5 frames) rather than measuring a compression quality for each frame. According to an embodiment, the electronic device 101 may reduce the number of total classification operations by identifying a section in which an image quality is changed in the video and measuring a compression quality in the section in which the image quality is changed.

Figure 11:
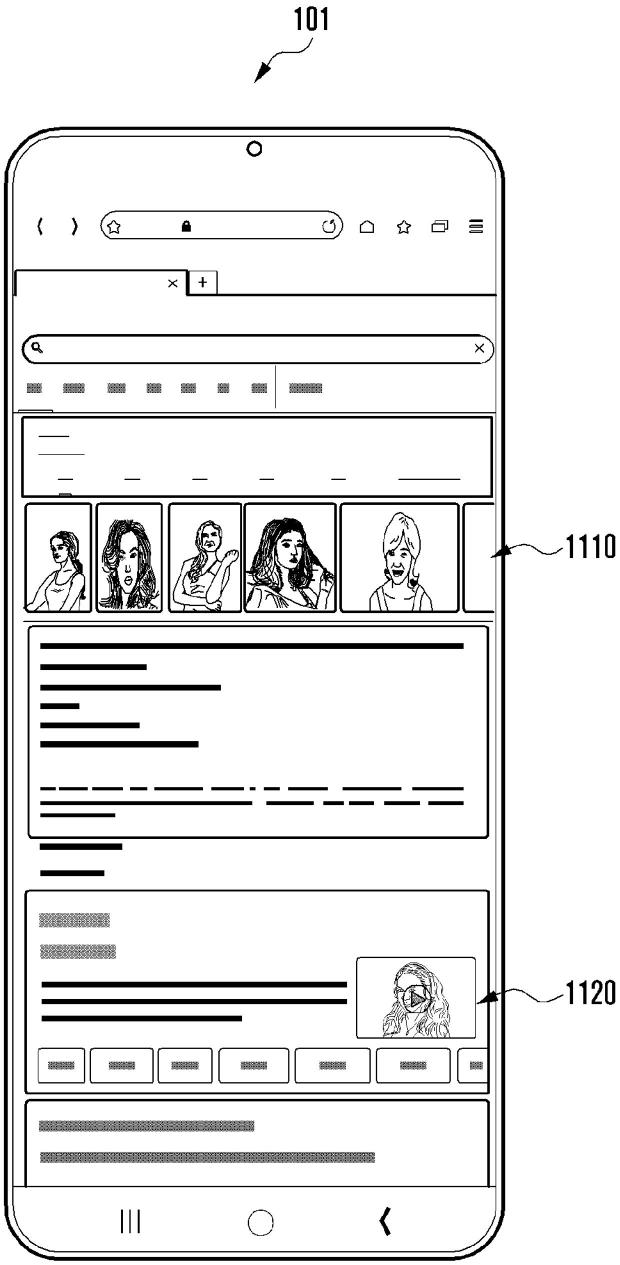
FIG. 11 is a diagram illustrating an example of an operation of processing image correction in the electronic device according to an embodiment.

FIG. 11 is a diagram illustrating an example of an operation of processing image correction in the electronic device according to an embodiment.

According to an embodiment, FIG. 11 may show an example in which, when executing (e.g., displaying) images or contents (e.g., an application (e.g., web page) execution screen) including images, the electronic device 101 may collectively perform correction in advance on given images (e.g., displayed images) and then provide the same to a user via the display module 160.

Referring to FIG. 11, the electronic device 101 may display contents (e.g., an application (e.g., web page) execution screen) including multiple images 1110 and 1120 via the display module 160 in response to a user's request. According to an embodiment, when displaying contents, the electronic device 101 may identify (e.g., extract) all the images 1110 and 1120 included in the contents. According to an embodiment, the electronic device 101 may collectively perform correction in advance on the identified images 1110 and 1120. According to an embodiment, the electronic device 101 may display the previously corrected images 1110 and 1120 via the display module 160.

According to an embodiment, based on content execution, the images 1110 and 1120 illustrated in FIG. 11 may be temporarily downloaded (e.g., stored in a cache of the memory 130) to the electronic device 101 from a corresponding external device (e.g., a content server), and corrected images obtained by removing compression artifacts from the temporarily downloaded images 1110 and 1120, based on a denoising model trained according to a classified compression quality may be displayed.

Figure 12A:
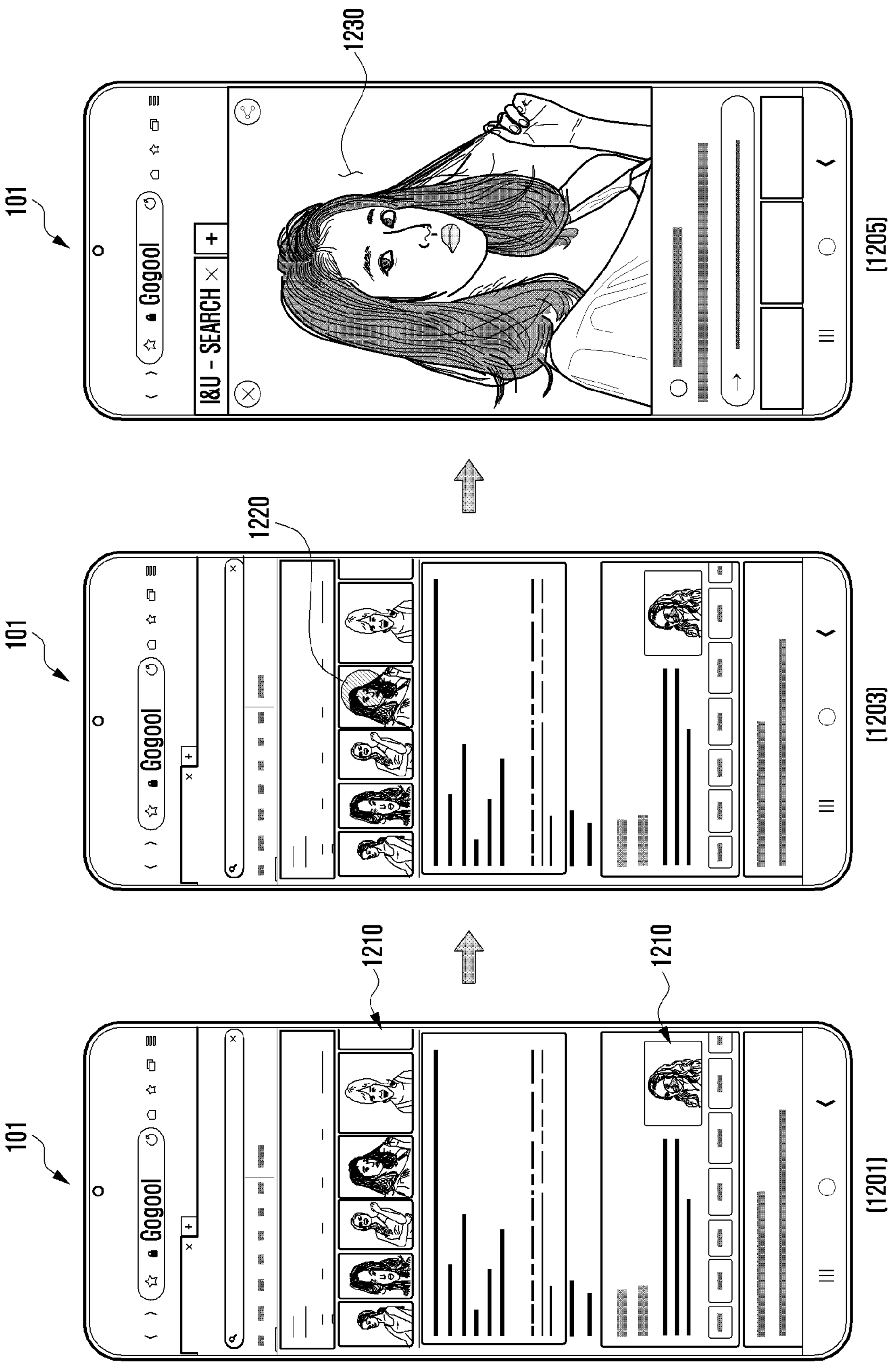
FIG. 12A and FIG. 12B are diagrams illustrating operation examples of processing image correction in the electronic device according to an embodiment.
Figure 12B:
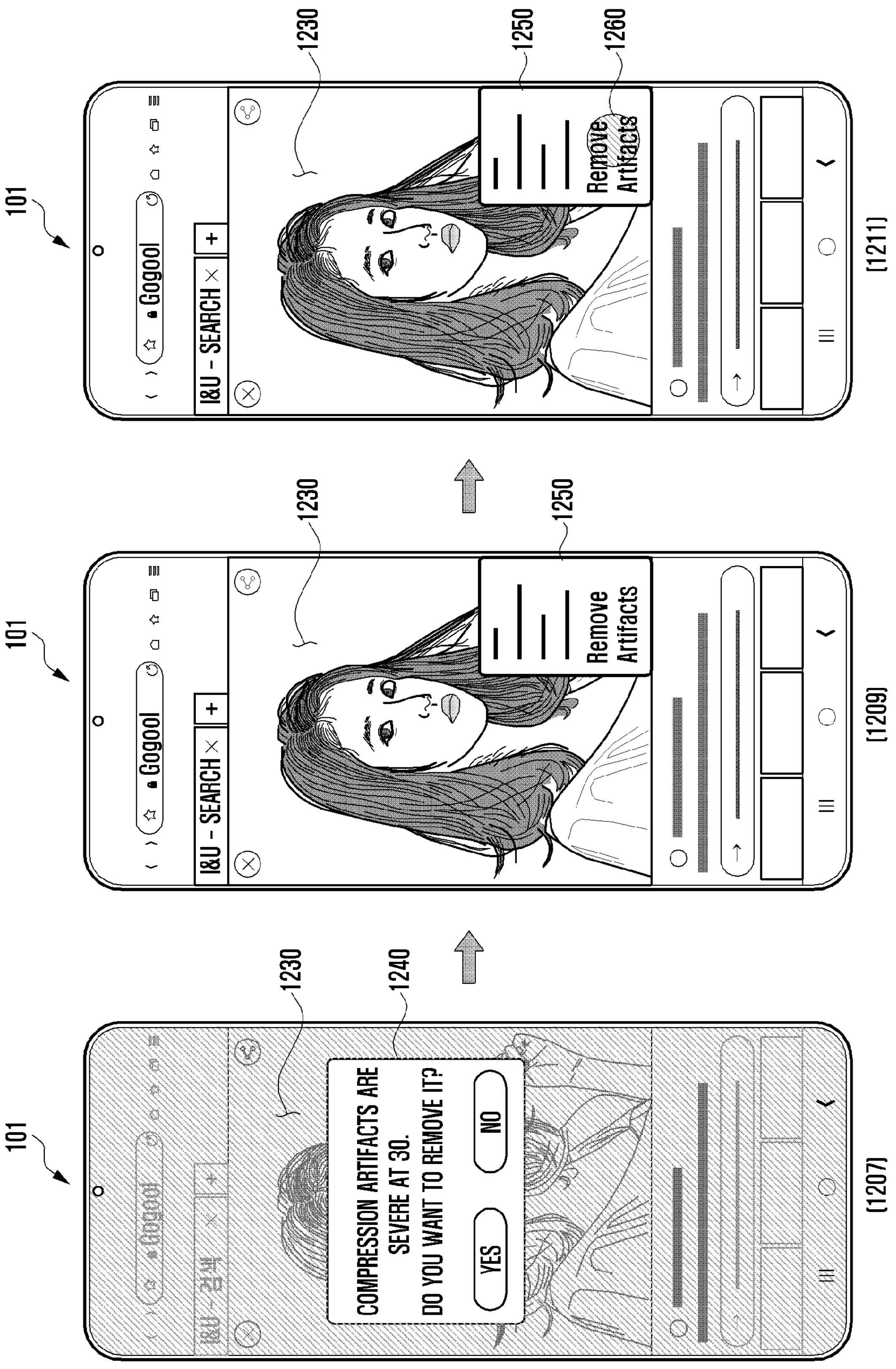

FIG. 12A and FIG. 12B are diagrams illustrating operation examples of processing image correction in the electronic device according to an embodiment.

According to an embodiment, FIG. 12A and FIG. 12B may show an example in which, while executing (e.g., displaying) images or contents (e.g., a web page application) including images, the electronic device 101 corrects a given image (e.g., an image based on a user's selection) and then provides the same to a user. For example, FIG. 12A and FIG. 12B may show an example of, during identification of the image by a user, providing information (e.g., an image quality notification) related to a compression quality of an image selected by the user, and correcting the image with a corresponding compression quality based on a user input.

Referring to FIG. 12A and FIG. 12B, example screen <1201> may show an example in which the electronic device 101 displays contents (e.g., an application (e.g., web page) execution screen) including multiple images 1210 via the display module 160.

Example screen <1203> may show an example in which a user selects one image 1220 among the displayed images 1210.

Example screen <1205> may show an example of an enlarged screen 1230 which is obtained by enlarging the user selected image 1210 (e.g., the given image) at a certain ratio so as to be provided, based on the user's selection of the image 1210.

Example screen <1207> may show an example of, when the electronic device 101 displays the given image 1210, classifying the compression quality of the given image 1210 and providing a result thereof via a pop-up message 1240. According to an embodiment, the electronic device 101 may determine, based on the user's selection of the image 1210, the compression quality of the corresponding image. According to an embodiment, the electronic device 101 may identify compression artifacts of the image 1210, based on a denoising model related to the determined compression quality. According to an embodiment, the electronic device 101 may provide information (e.g., a message such as "Compression artifacts are severe at 30. Do you want to remove it?) related to the compression artifacts via a pop-up message 1240 on the enlarged screen 1230, based on a result of the identification. For example, if the compression quality of the image 1210 is equal to or less than a specific threshold, the electronic device 101 may notify the user of the same and request image correction. According to an embodiment, the user may determine whether to correct the image 120 selected by the user, based on the pop-up message 1240.

Example screen <1209> may show a screen example of a case where image correction is requested from the user based on the pop-up message 1240, for example, a case where an approval input for requesting removal of compression artifacts is received from the user via the pop-up message 1240. According to an embodiment, as illustrated in example screen <1207>, the electronic device 101 may provide an option menu 1250 for removal of artifacts in the image 1220, via a designated area of the screen 1230. According to an embodiment, the designated area may be an edge proximity area that does not cover the image 1220, such as the bottom right of the screen, the top right of the screen, the bottom left of the screen, or the top left of the screen. According to an embodiment, the option menu 1250 may include multiple option objects (e.g., compression quality: −30, compression quality: 60, and/or compression quality: +30) provided to enable the user to select a compression quality, and an execution object (e.g., Remove Artifacts) capable of executing artifact removal based on the selected option.

Example screen <1211> may show an example in which the user selects one option object from the option menu 1250 related to artifact removal, and then selects 1260 (e.g., touches) an execution object for executing artifact removal. According to an embodiment, the electronic device 101 may remove artifacts by applying a corresponding denoising model, based on the user-selected option (e.g., compression quality) based on a user input. According to an embodiment, when the execution object is selected via the option menu 1250, the electronic device 101 may provide the user with multiple images (e.g., sample images) to which different correction strengths corresponding to the multiple options have been applied in advance, select one image to be applied from the multiple images, and remove artifacts based on a compression quality of the selected image. An example of this is shown in FIG. 13.

Figure 13:
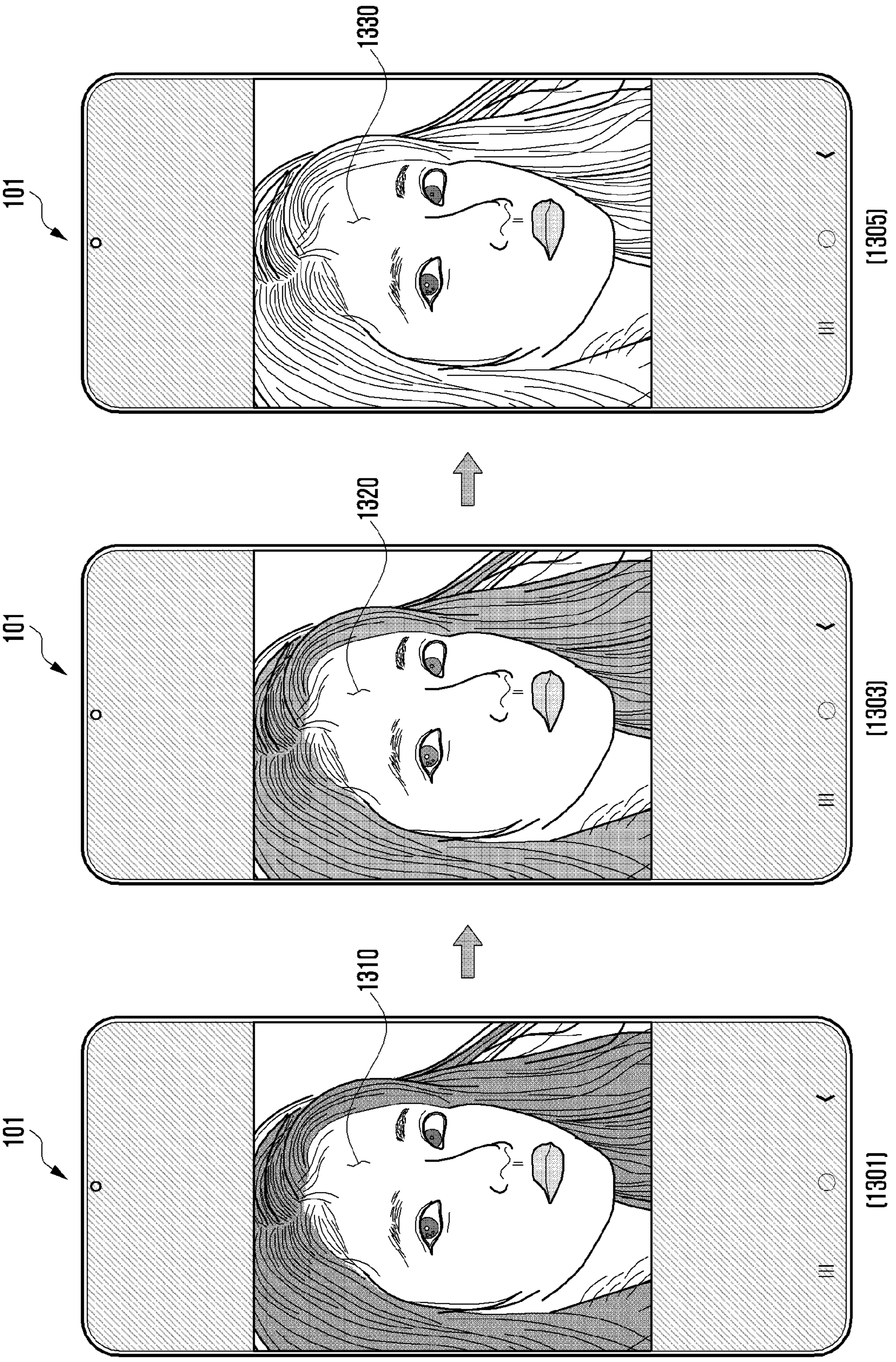
FIG. 13 is a diagram illustrating an example of a user interface for image processing based on a user's intention in the electronic device and an operation therefor according to an embodiment.

FIG. 13 is a diagram illustrating an example of a user interface for image processing based on a user's intention in the electronic device and an operation therefor according to an embodiment.

According to an embodiment, FIG. 13 may show, for example, based on the user input in FIG. 12B, various examples of respective sample images from which compression artifacts have been removed based on denoising models trained to correspond to respective compression qualities classified for the image 1220 selected by the user.

As illustrated in FIG. 13, the electronic device 101 may display images 1310, 1320, and 1330, to which different correction strengths have been applied, to a user and enable the user to select the same. According to an embodiment, example screen <1301> may show a first sample image 1310 to which a first correction strength (e.g., compression quality: −30) is applied. According to an embodiment, example screen <1303> may show a second sample image 1320 to which a second correction strength (e.g., compression quality: 60) is applied. According to an embodiment, example screen <1305> may show a third sample image 1330 to which a third correction strength (e.g., compression quality: +30) is applied. For example, the electronic device 101 may provide the user with multiple images 1310, 1320, and 1330 obtained by respectively applying different correction strengths to the given image 1220.

According to an embodiment, when providing the images 1310, 1320, and 1330 to which correction strengths have been applied, for example, when displaying a screen for correction, in order to clearly show a degree of improvement in the compression quality to the user, the electronic device 101 may provide a face part, a person (e.g., whole body) part, a salient part, and/or a part with the greatest difference in PSNR before and after improvement. For example, as illustrated in FIG. 13, the electronic device 101 may perform enlargement based on a corresponding feature part, and place and display the same in the center of the screen so as to identify the degree of improvement in detail during correction. Although not illustrated, those skilled in the art would easily understand that the electronic device 101 may display an image with an existing size without a change.

Figure 14:
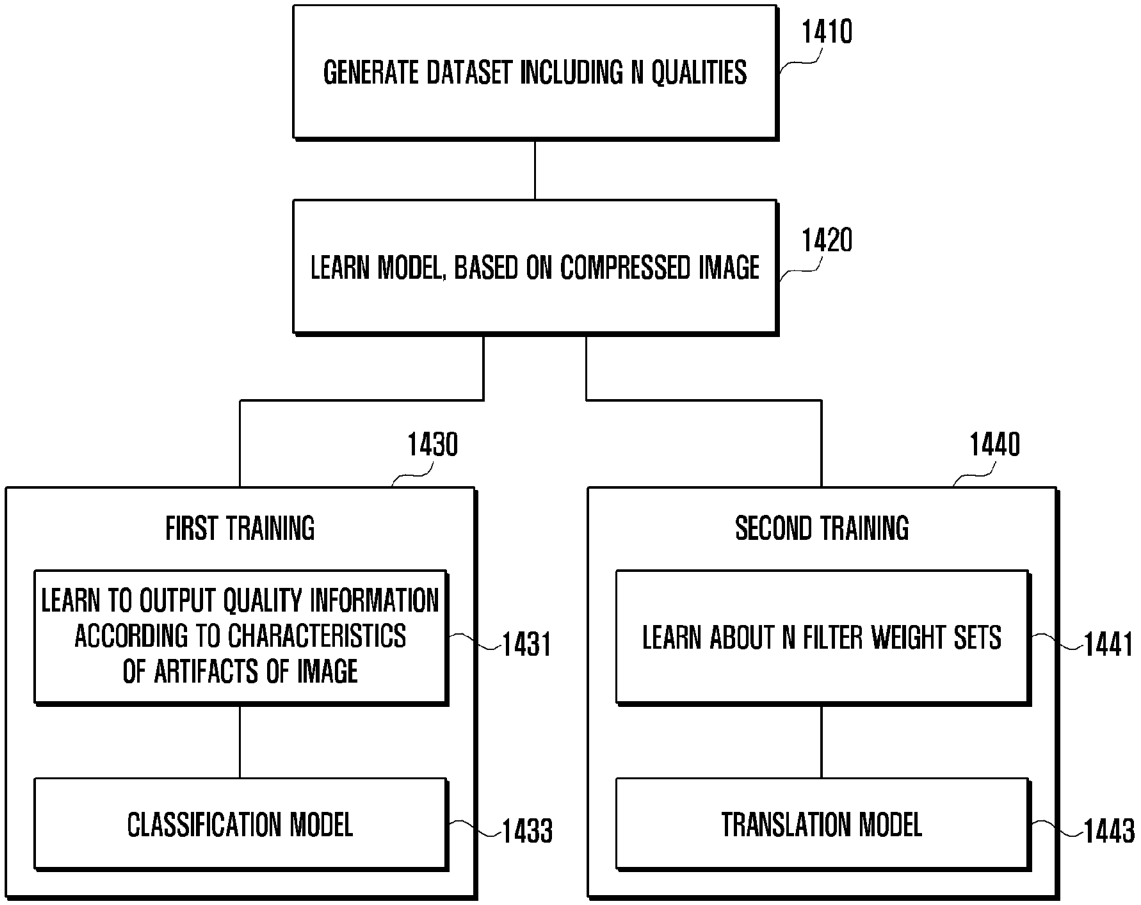
FIG. 14 is a diagram illustrating an operation example of training in the electronic device according to an embodiment.

FIG. 14 is a diagram illustrating an operation example of training in the electronic device according to an embodiment.

According to an embodiment, FIG. 14 may show an example of pre-training performed by the electronic device 101. According to an embodiment, pre-training performed by the electronic device 101 as illustrated in FIG. 14 may be performed, for example, in another environment (e.g., a developer workstation and/or a cloud environment) and may be downloaded in the electronic device 101.

Referring to FIG. 14, in block 1410, the processor 120 of the electronic device 101 may generate a dataset including n qualities. According to an embodiment, in order to generate a dataset including compression qualities of multiple (e.g., n) classes, the processor 120 may perform coefficient quantization, transform, and/or subsampling of channels of images in N levels.

In block 1420, the processor 120 may train a model, based on a compressed image. According to an embodiment, the processor 120 may perform first training (e.g., block 1430) and second training (e.g., block 1440) relating to the compressed image. According to an embodiment, the first training 1430 may indicate training that allows a target denoising model to analyze artifacts of a transform patch so as to determine a compression quality. According to an embodiment, the second training 1440 may indicate training to perform filtering on the compressed image to acquire n filter weight sets so that the compressed image becomes similar to the original image. According to an embodiment, the processor 120 may perform the first training 1430 and the second training 1440 in parallel, sequentially, or heuristically.

According to an embodiment, in the first training 1430 method, the processor 120 may perform training (block 1431) to output quality information (e.g., numbers) according to characteristics of artifacts, for example, based on artifact analysis of the compressed image. According to an embodiment, the processor 120 may generate (block 1433) one classification model according to training (block 1431). According to an embodiment, the processor 120 may use the classification model generated based on the first training 1430, for classification of a compression quality in FIG. 15, which is to be described later.

According to an embodiment, the processor 120 may enable learning of (block 1441), for example, N filter weight sets in the second training 1440 method. For example, the processor 120 may perform filtering on the compressed image and enable learning of N filter weight sets so that the compressed image becomes similar to the original image. According to an embodiment, the processor 120 may generate (block 1443) n translation models (e.g., 1, 2, . . . , . . . , n) according to the second training 1441. According to an embodiment, the processor 120 may select one translation model during compression artifact removal to be described later, based on the n translation models generated based on the second training 1440.

Figure 15:
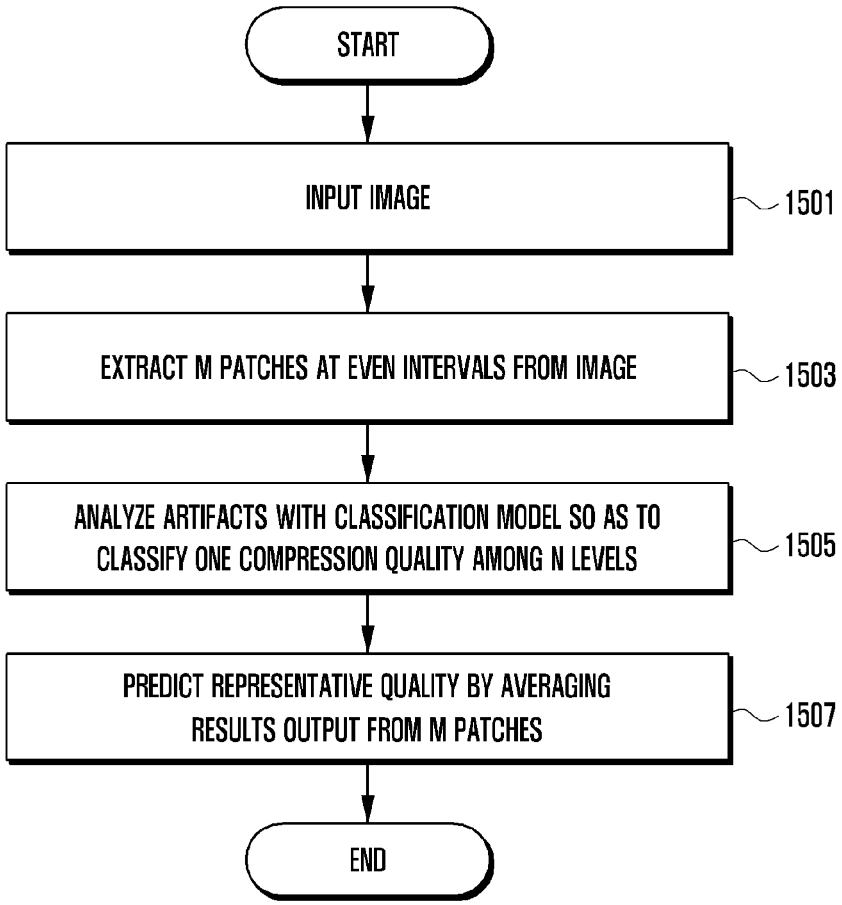
FIG. 15 is a flowchart illustrating an operation method of classifying a compression quality in the electronic device according to an embodiment.

FIG. 15 is a flowchart illustrating an operation method of classifying a compression quality in the electronic device according to an embodiment.

According to an embodiment, FIG. 15 may show an example of compression quality classification performed by the electronic device 101.

Referring to FIG. 15, in operation 1501, the processor 120 of the electronic device 101 may input an image. According to an embodiment, the processor 120 may input an image of a compression quality to be improved, as an image of a training target.

In operation 1503, the processor 120 may extract, from the image, about M patches at even intervals. According to an embodiment, the processor 120 may equally extract, for example, about 256 16×16 patches, from the input image.

In operation 1505, the processor 120 may classify (or distinguish) one compression quality among N levels (e.g., quality information (e.g., numbers) based on characteristics of artifacts) by analyzing artifacts with a classification model. According to an embodiment, the processor 120 may analyze corresponding artifacts according to the classification model generated based on the first training (block 1430) in FIG. 14, and perform classification into one compression quality among the compression qualities of N levels.

In operation 1507, the processor 120 may predict (or derive) a representative quality (or final quality (Q)) of the image by averaging results output from the M patches. According to an embodiment, the processor 120 may use the predicted representative quality of the image, as an input of the compression quality of the image during compression artifact removal to be described later.

Figure 16:
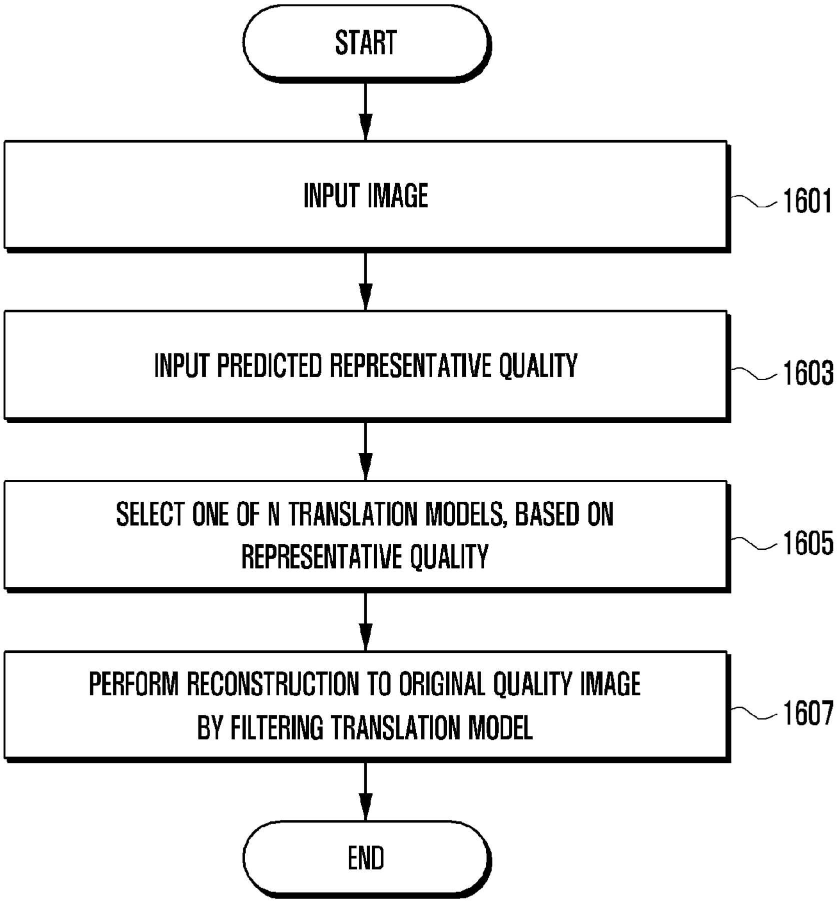
FIG. 16 is a flowchart illustrating an operation method of removing artifacts in the electronic device according to an embodiment.

FIG. 16 is a flowchart illustrating an operation method of removing artifacts in the electronic device according to an embodiment.

According to an embodiment, FIG. 16 may show an example of removing artifacts to correspond to a classified compression quality in the electronic device 101.

Referring to FIG. 16, in operation 1601, the processor 120 of the electronic device 101 may input an image. According to an embodiment, the processor 120 may input an image (e.g., the image of the training target in FIG. 15) of a compression quality to be improved, as a target image for compression artifact removal.

In operation 1603, the processor 120 may input a predicted representative quality. According to an embodiment, the processor 120 may input the representative quality predicted in FIG. 15, as a compression quality of the target image for compression artifact removal.

In operation 1605, the processor 120 may select one of N translation models, based on the representative quality. According to an embodiment, the processor 120 may select a translation model (e.g., translation model i) corresponding to the representative quality from among n translation models generated according to the second training (block 1440) in FIG. 14.

In operation 1607, the processor 120 may reconstruct the compressed image to the original quality image (e.g., the original image) by filtering the selected translation model (e.g., translation model i).

Figure 17:
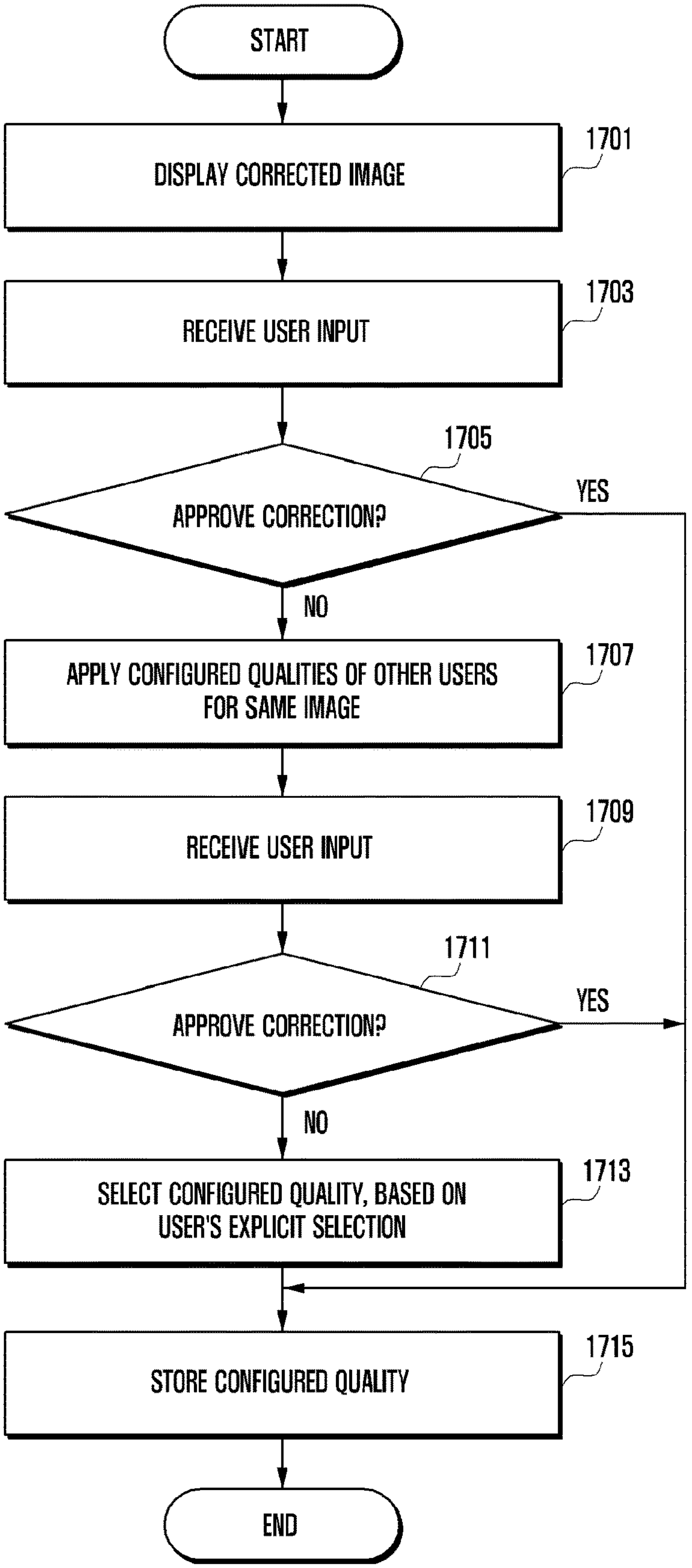
FIG. 17 is a flowchart illustrating an operation method of correcting a compression quality in the electronic device according to an embodiment.

FIG. 17 is a flowchart illustrating an operation method of correcting a compression quality in the electronic device according to an embodiment.

According to an embodiment, FIG. 17 may show an example of secondarily additionally correcting, based on a user's input, an image having a primarily corrected compression quality in the electronic device 101.

Referring to FIG. 17, in operation 1701, the processor 120 of the electronic device 101 may display a corrected image. According to an embodiment, the processor 120 may display, via the display module 160, the corrected image obtained by correction based on a denoising model trained to correspond to a compression quality of the given image (e.g., the compressed image). According to an embodiment, when providing the corrected image, the processor 120 may also provide a user interface enabling interaction with a user in order to identify the user's intention.

In operation 1703, the processor 120 may receive a user input. According to an embodiment, the processor 120 may receive a user input regarding whether the user is satisfied with the corrected image. For example, the user may select approval or rejection of the corrected image, based on a designated user interface, and the processor 120 may receive a user input for approval or rejection.

In operation 1705, the processor 120 may determine, based on the user input, whether correction is approved. According to an embodiment, the processor 120 may determine whether the user input approves the corrected image or rejects the corrected image.

In operation 1705, if correction is approved (e.g., "Yes" in operation 1705), the processor 120 may store a configured quality (e.g., a compression compensation level) in operation 1715. According to an embodiment, the processor 120 may store information on the compression quality of the image and an application (or service) in which the image is provided (or running), as a configured quality for the compression quality.

In operation 1705, if correction is not approved (e.g., "No" in operation 1705), the processor 120 may apply configured qualities of other users to the same image in operation 1707. According to an embodiment, the processor 120 may externally acquire (e.g., receive) a configured quality preconfigured by another user for the given image, and may process (e.g., image correction) the given image, based on the acquired configured quality so as to display the same via the display module 160. According to an embodiment, when providing the corrected image, the processor 120 may also provide a user interface capable of receiving a user's input in order to identify the user's intention.

In operation 1709, the processor 120 may receive a user input. According to an embodiment, the processor 120 may receive a user input regarding whether the user is satisfied with the corrected image to which the configured quality of another user has been applied. For example, the user may select approval or rejection of the corrected image, based on a designated user interface, and the processor 120 may receive a user input for approval or rejection.

In operation 1711, the processor 120 may determine, based on the user input, whether correction is approved. According to an embodiment, the processor 120 may determine whether the user input approves the corrected image or rejects the corrected image.

In operation 1711, if correction is approved (e.g., "Yes" in operation 1711), the processor 120 may store the configured quality in operation 1715. According to an embodiment, the processor 120 may store information on the compression quality of the image, the additionally applied configured quality, and an application (or service) to which the image is provided, as the configured quality for the compression quality. For example, the processor 120 may receive a compression correction level of another user so as to configure a compression correction level for the image.

In operation 1711, if correction is not approved (e.g., "No" in operation 1711), the processor 120 may select a configured quality, based on the user's explicit selection in operation 1713. According to an embodiment, if correction approval is rejected, the processor 120 may provide a user interface (e.g., FIG. 8 and/or FIG. 9) which enables a user to directly select a correction strength for the image. According to an embodiment, the processor 120 may select, as the configured quality, a correction strength for the image, which is input from the user via the designated user interface.

In operation 1715, the processor 120 may store the configured quality. According to an embodiment, the processor 120 may store information on the compression quality of the image, the configured quality designated according to the user input, and an application (or service) to which the image is provided, as the configured quality for the compression quality.

Provided herein is a method of an electronic device, the method including: displaying a screen including at least one image via a display module; determining a compression quality of the at least one image; selecting a denoising model trained to correspond to the compression quality; performing an image correction based on the denoising model; and displaying a corrected image via the display module. See FIG. 3.

In some embodiments, the corrected image is associated with a first configured quality, the method further including: providing a user interface enabling interaction with a user in order to identify an intention of the user; receiving a first user input indicating whether the user is satisfied with the corrected image; when the first user input indicates that the user rejects the corrected image: applying a second configured quality of an other user for the at least one image; and when the first user input indicates that the user approves the corrected image: storing the first configured quality in a memory. See FIG. 17 items 1701, 1703, 1705, 1707 and 1715.

In some embodiments, the first configured quality is associated with a first service and the first configured quality is associated with a first level of a first compression quality associated with the first service. See FIGS. 6, 11 and 12A.

In some embodiments, the second configured quality is associated with a second service and the second configured quality is associated with a second level of a second compression quality associated with the second service. See FIGS. 6, 11 and 12A.

In some embodiments, the first user input indicates that the user rejects the corrected image, the method further includes: displaying a second corrected image based the second configured quality; receiving a second user input, wherein the second user input indicates that the second corrected image is rejected; selecting a third configured quality based on an explicit user input; displaying a third corrected image based on the third configured quality; and storing the third configured quality in the memory. See FIG. 17 items 1707, 1709, 1711, 1713 and 1715.

Also provided is a non-transitory computer readable medium storing instructions to be executed by a computer, wherein the instructions are configured to cause the computer to at least: display a screen including at least one image via a display module, determine a compression quality of the at least one image, select a denoising model trained to correspond to the compression quality, peform an image correction based on the denoising model, and display a corrected image via the display module. See FIG. 2 and FIG. 3.

According to various embodiments, the electronic device 101 may train the compression quality classification module 250 and the denoising model 230 suitable for a compression quality by using images (e.g., compressed images) compressed with compression qualities of various classes so as to perform classification without an explicit indication of the image processing module 210 (e.g., compression encoder), and may perform image processing on the given image by determining compression artifacts (e.g., compression artifact removal method) for each compression quality, based on the trained denoising model 230.

According to an embodiment, in applying of the denoising model 230, the electronic device 101 may select a final denoising model in complex consideration of personalization of users, the screen size of the electronic device 101, and/or characteristics of an application (or service).

An operation method of the electronic device 101 according to an embodiment of the disclosure may include displaying a screen including at least one image via the display module 160, determining a compression quality of the at least one image, selecting a denoising model trained to correspond to the determined compression quality, processing image correction based on the selected denoising model, and displaying the corrected image via the display module.

According to an embodiment, the determining of the compression quality may include classifying the compression quality in units of patches of the at least one image, wherein the at least one image is a compressed image compressed with a designated compression quality.

According to an embodiment, the classifying of the compression quality may include equally extracting multiple areas from the image in the units of patches, and classifying the compression quality of the image, based on an average or median value of compression qualities of the extracted areas.

According to an embodiment, the classifying of the compression quality may include analyzing edge components based on the extracted areas, and excluding an area, in which an edge component has a value equal to or smaller than a designated threshold, from calculation of the average or median value.

According to an embodiment, the classifying of the compression quality may include identifying a type of an application or service that provides the at least one image, identifying a corresponding designated compression quality, based on the type of the application or service, and classifying the compression quality of the image, based on the designated compression quality.

According to an embodiment, the selecting of the denoising model may include storing, in the memory, multiple denoising models pre-trained for each of various compression qualities, and selecting a denoising model trained to correspond to classification of the compression quality of the image from among the multiple denoising models, wherein the denoising model is selected by additionally considering at least one of user personalization, the type of the service or application providing the image, and/or the screen size of the display module.

According to an embodiment, the processing of the image correction may include removing compression artifacts from the image according to a correction strength corresponding to the selected denoising model, and reconstructing the image to an original image before compression.

According to an embodiment, the processing of the image correction may include, during the image correction, providing a user interface enabling interaction with a user in order to identify information on the image correction and the user's intention, receiving a user input based on the user interface, and performing post-processing of the corrected image, based on the user input.

The various embodiments of the disclosure disclosed in the specification and drawings are merely specific examples to easily explain the technical content of the disclosure and to help understanding the disclosure, and are not intended to limit the scope of the disclosure. Therefore, the scope of the disclosure should be interpreted to include all modifications or modified forms derived based on the technical spirit of the disclosure, in addition to the embodiments disclosed herein.

The invention claimed is:

1. An electronic device comprising:
a display;
a memory storing instructions; and
a processor operatively connected to the display and the memory, wherein the instructions, when executed by the processor, cause the electronic device to:
identify a type of an application providing at least one image;
select a denoising model related to the identified type of the application from a plurality of denoising models trained to correspond to the respective one or more compression qualities;
perform an image correction based on the denoising model; and
display a corrected image via the display.

2. The electronic device of claim 1, wherein the instructions, when executed by the processor further cause the electronic device to:
determine a compression quality of the at least one image; and
classify the compression quality in units of patches of the at least one image,
wherein the at least one image is a compressed image obtained by compression with a designated compression quality.

3. The electronic device of claim 2, wherein the instructions, when executed by the processor further cause the electronic device to:
extract two or more areas in the units of patches from the at least one image; and
classify the compression quality of the at least one image, based on an average or median value of compression qualities of the two or more areas.

4. The electronic device of claim 3, wherein the instructions, when executed by the processor further cause the electronic device to:
analyze edge components, based on the two or more areas; and
exclude a first area of the two or more areas, in which an edge component has a first value equal to or smaller than a designated threshold, from calculation of the average or median value.

5. The electronic device of claim 2, wherein the instructions, when executed by the processor further cause the electronic device to:
store, in the memory, multiple denoising models previously trained for each of various compression qualities;
select the denoising model trained to correspond to classification of the compression quality of the at least one image from among the multiple denoising models; and
during selection of the denoising model, select the denoising model by additionally considering at least one of a user's personalization, a type of a service or application providing an image, or a screen size of the display.

6. The electronic device of claim 2, wherein the instructions, when executed by the processor further cause the electronic device to:
remove compression artifacts from the at least one image according to a correction strength corresponding to the denoising model; and
reconstruct the at least one image to an original image before compression.

7. The electronic device of claim 2, wherein the instructions, when executed by the processor further cause the electronic device to:
during the image correction, provide a user interface, wherein the user interface enables interaction with a user in order to identify information on the image correction and an intention of the user;
receive a user input based on the user interface; and
perform post-processing of the corrected image, based on the user input.

8. The electronic device of claim 2, wherein the instructions, when executed by the processor further cause the electronic device to:
during displaying of a screen, temporarily download the at least one image from an external device corresponding to the at least one image, based on content execution; and
provide the corrected image obtained by removing compression artifacts from the at least one image, the removing being performed based on the denoising model trained according to the compression quality.

9. The electronic device of claim 2, wherein the instructions, when executed by the processor further cause the electronic device to:

display a corresponding screen based on content execution comprising the at least one image, based on a user's image selection on the display, enlarge a user-selected image at a certain ratio and provide the same; and during displaying of the user-selected image, classify the compression quality of the user-selected image and provide a result thereof via a pop-up message.

10. A method of an electronic device, the method comprising:

identifying a type of an application providing at least one image;

selecting a denoising model related to the identified type of the application from a plurality of denoising models trained to correspond to one or more compression qualities;

performing an image correction based on the denoising model; and displaying a corrected image via the display.

11. The method of claim 10, further comprising:

determining a compression quality of at least one image; and classifying the compression quality in units of patches of the at least one image, wherein the at least one image is a compressed image obtained by compression with a designated compression quality.

12. The method of claim 11, wherein the classifying of the compression quality comprises:

extracting two or more areas in the units of patches from the at least one image; and classifying the compression quality of the at least one image, based on an average or median value of compression qualities of the two or more areas.

13. The method of claim 12, wherein the classifying of the compression quality further comprises:

analyzing edge components, based on the two or more areas; and excluding a first area of the two or more areas, in which an edge component has a first value equal to or smaller than a designated threshold, from calculation of the average or median value.

14. The method of claim 10, wherein the corrected image is associated with a first configured quality, the method further comprising:

providing a user interface enabling interaction with a user in order to identify an intention of the user;

receiving a first user input indicating whether the user is satisfied with the corrected image;

when the first user input indicates that the user rejects the corrected image:

applying a second configured quality preconfigured by an other user for the at least one image; and when the first user input indicates that the user approves the corrected image:

storing the first configured quality in a memory.

15. The method of claim 14, wherein the first configured quality is associated with a first application and the first configured quality is associated with a first level of a first compression quality associated with the first application.

16. The method of claim 15, wherein the second configured quality is associated with a second application and the second configured quality is associated with a second level of a second compression quality associated with the second application.

17. The method of claim 14, wherein, when the first user input indicates that the user rejects the corrected image, the method further comprises:

displaying a second corrected image based the second configured quality;

receiving a second user input, wherein the second user input indicates that the second corrected image is rejected;

selecting a third configured quality based on an explicit user input;

displaying a third corrected image based on the third configured quality; and storing the third configured quality in the memory.

18. A non-transitory computer readable medium storing instructions to be executed by a computer, wherein the instructions are configured to cause the computer to at least:

identify a type of an application or providing at least one image, select a denoising model related to the identified type of the application from a plurality of denoising models trained to correspond to one or more compression qualities, perform an image correction based on the denoising model, and display a corrected image via the display.

* * * * *